United States Patent
Yamada

(10) Patent No.: US 10,509,756 B2
(45) Date of Patent: Dec. 17, 2019

(54) CIRCUIT DEVICE, ELECTRONIC DEVICE, AND CABLE HARNESS

(71) Applicant: SEIKO EPSON CORPORATION, Tokyo (JP)

(72) Inventor: Toshimichi Yamada, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/367,485

(22) Filed: Mar. 28, 2019

(65) Prior Publication Data
US 2019/0303331 A1    Oct. 3, 2019

(30) Foreign Application Priority Data
Mar. 29, 2018 (JP) .................. 2018-065199

(51) Int. Cl.
| | | |
|---|---|---|
| G06F 13/38 | (2006.01) | |
| G06F 13/40 | (2006.01) | |
| G06F 13/20 | (2006.01) | |
| G06F 13/42 | (2006.01) | |
| B60R 16/023 | (2006.01) | |
| B60R 16/02 | (2006.01) | |

(52) U.S. Cl.
CPC .......... *G06F 13/4022* (2013.01); *G06F 13/20* (2013.01); *G06F 13/4282* (2013.01); *B60R 16/023* (2013.01); *B60R 16/0207* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 2002/0062457 A1 | 5/2002 | Kamihara | | |
| 2007/0033308 A1* | 2/2007 | Teng | ...................... | G06F 13/385 710/62 |
| 2009/0164805 A1* | 6/2009 | Diab | ........................ | G06F 1/26 713/300 |
| 2009/0271557 A1* | 10/2009 | Hsu | ..................... | G06F 13/4027 710/315 |
| 2014/0181325 A1* | 6/2014 | Hundal | ................. | G06F 13/126 710/5 |
| 2016/0306763 A1* | 10/2016 | Geva | ........................ | G06F 13/36 |
| 2018/0212796 A1* | 7/2018 | Kamihara | ............ | G06F 13/4022 |

FOREIGN PATENT DOCUMENTS

| | | |
|---|---|---|
| JP | 2002-141911 A | 5/2002 |
| JP | 2006-135397 A | 5/2006 |

* cited by examiner

*Primary Examiner* — Hyun Nam
(74) *Attorney, Agent, or Firm* — Oliff PLC

(57) ABSTRACT

A circuit device includes first and second physical layer circuits, a bus switch circuit that switches connection between a first bus and a second bus that comply with a USB standard, on in a first period and off in a second period, and a processing circuit that performs, in the second period, processing for transferring packets on a transfer route that includes the first bus, the first and second physical layer circuits, and the second bus. When a host chirp K/J is detected on the first bus by the first physical layer circuit, the second physical layer circuit outputs a host chirp K/J to the second bus in the state where connection between the first bus and the second bus is switched off by the bus switch circuit.

14 Claims, 20 Drawing Sheets

CIRCUIT DEVICE, ELECTRONIC DEVICE, AND CABLE HARNESS

BACKGROUND

This application claims the benefit of priority from Japanese Patent Application No. 2018-065199 filed Mar. 29, 2018, the entire contents of which are incorporated herein by reference.

1. Technical Field

The present invention relates to a circuit device, an electronic device, a cable harness, and the like.

2. Related Art

A circuit device that realizes USB (universal serial bus) data transfer control is known. The techniques disclosed in JP-A-2006-135397 and JP-A-2002-141911 are known examples of such a circuit device. For example, JP-A-2006-135397 discloses technology in which an enable control signal for a current source of an HS (high speed) mode transmission circuit is set to active at a timing before a packet transmission start timing. JP-A-2002-141911 discloses technology in which, in the case where a switch from the HS mode to an FS (full speed) mode is performed, self-running is disabled for a PLL that generates a high-speed clock for the HS mode.

JP-A-2006-135397 and JP-A-2002-141911 are examples of related art.

In USB technology, an HS mode transmission circuit is provided in a physical layer circuit. However, parasitic capacitance and parasitic resistance exist in the signal path of transmission signals in the HS mode transmission circuit, and therefore there is a problem of degradation in the signal characteristics of the transmission signals due to such parasitic capacitance and parasitic resistance. In order to solve such a problem, a technique for providing a circuit device that improves the signal characteristics, between a host and device of the USB is conceivable. However, if the on-resistance of a bypass switch circuit that is provided in this circuit device is high, problems of change in the voltage of a USB chirp signal resulting from this on-resistance and the like occur.

SUMMARY

One aspect of the present invention pertains to a circuit device that includes a first physical layer circuit to which a first bus that complies with a USB standard is connected, a second physical layer circuit to which a second bus that complies with the USB standard is connected, a bus switch circuit, one end of which is connected to the first bus, another end of which is connected to the second bus, and that switches connection between the first bus and the second bus on in a first period and off in a second period, and a processing circuit that performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit, and when a host chirp K/J is detected on the first bus by the first physical layer circuit, the second physical layer circuit outputs a host chirp K/J to the second bus in a state where connection between the first bus and the second bus is switched off by the bus switch circuit.

Also, in one aspect in the present invention, in a case where HS termination is detected on the second bus by the second physical layer circuit, the first physical layer circuit may switch on HS termination of the first physical layer circuit.

Also, in one aspect in the present invention, the first physical layer circuit may detect the host chirp K/J on the first bus in a state where the HS termination of the first physical layer circuit is off, and in a case where the HS termination is detected on the second bus by the second physical layer circuit, may switch on the HS termination of the first physical layer circuit.

Also, in one aspect in the present invention, when a device chirp K is detected on the second bus, the first physical layer circuit may output a device chirp K to the first bus in a state where connection between the first bus and the second bus is switched off by the bus switch circuit.

Also, in one aspect in the present invention, a detection circuit that performs current detection in the bus switch circuit is included, and when the detection circuit detects flow of a current from the second bus to the first bus via the bus switch circuit after USB bus reset, the first physical layer circuit may output the device chirp K to the first bus.

Also, in one aspect in the present invention, when the detection circuit detects flow of a current from the second bus to the first bus via the bus switch circuit, the bus switch circuit may switch connection between the first bus and the second bus from on to off, and the second physical layer circuit may switch on HS termination of the second physical layer circuit.

Also, in one aspect in the present invention, when a current flows from the second bus to the first bus via the bus switch circuit after the bus reset, the detection circuit may detect that the first bus is a bus on an upstream side and the second bus is a bus on a downstream side, and when a current flows from the first bus to the second bus via the bus switch circuit after the bus reset, may detect that the first bus is a bus on a downstream side and the second bus is a bus on an upstream side.

Also, in one aspect in the present invention, when stop of output of the device chirp K is detected on the second bus, the first physical layer circuit may stop outputting the device chirp K to the first bus.

Also, in one aspect in the present invention, when the host chirp K/J is detected on the first bus by the first physical layer circuit after stop of the device chirp K on the second bus, the second physical layer circuit may output the host chirp K/J to the second bus.

Also, one aspect in the present invention pertains to a circuit device that includes a first physical layer circuit to which a first bus that complies with a USB standard is connected, a second physical layer circuit to which a second bus that complies with the USB standard is connected, a bus switch circuit, one end of which is connected to the first bus, another end of which is connected to the second bus, and that switches connection between the first bus and the second bus on in a first period and off in a second period, a processing circuit that performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit, and a detection circuit that detects that the first bus is a bus on an upstream side and the second bus is a bus on a downstream side, when a current flows from the second bus to the first bus via the bus switch circuit after USB bus reset, and detects that the first bus is a bus on a downstream side and the second bus is a bus on an upstream side, when a current flows from the first bus to the second bus via the bus switch circuit after the bus reset.

Also, in one aspect in the present invention, when the detection circuit detects flow of a current from the second bus to the first bus via the bus switch circuit after the bus reset, the first physical layer circuit may output a device chirp K to the first bus.

Also, in one aspect in the present invention, when a host chirp K/J is detected on the first bus by the first physical layer circuit, the second physical layer circuit may output a host chirp K/J to the second bus.

Also, another aspect of the invention pertains to an electronic device including the circuit device according to any of the above aspects, and a processing device that is connected to the first bus.

Also, another aspect of the invention pertains to a cable harness including the circuit device according to any of the above aspects, and a cable.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following is a detailed description of preferred embodiments of the invention. Note that the embodiments described below are not intended to unduly limit the content of the invention recited in the claims, and all of the configurations described in the embodiments are not necessarily essential as solutions provided by the invention.

1. Signal Characteristics of Transmission Signals

Figure 1:
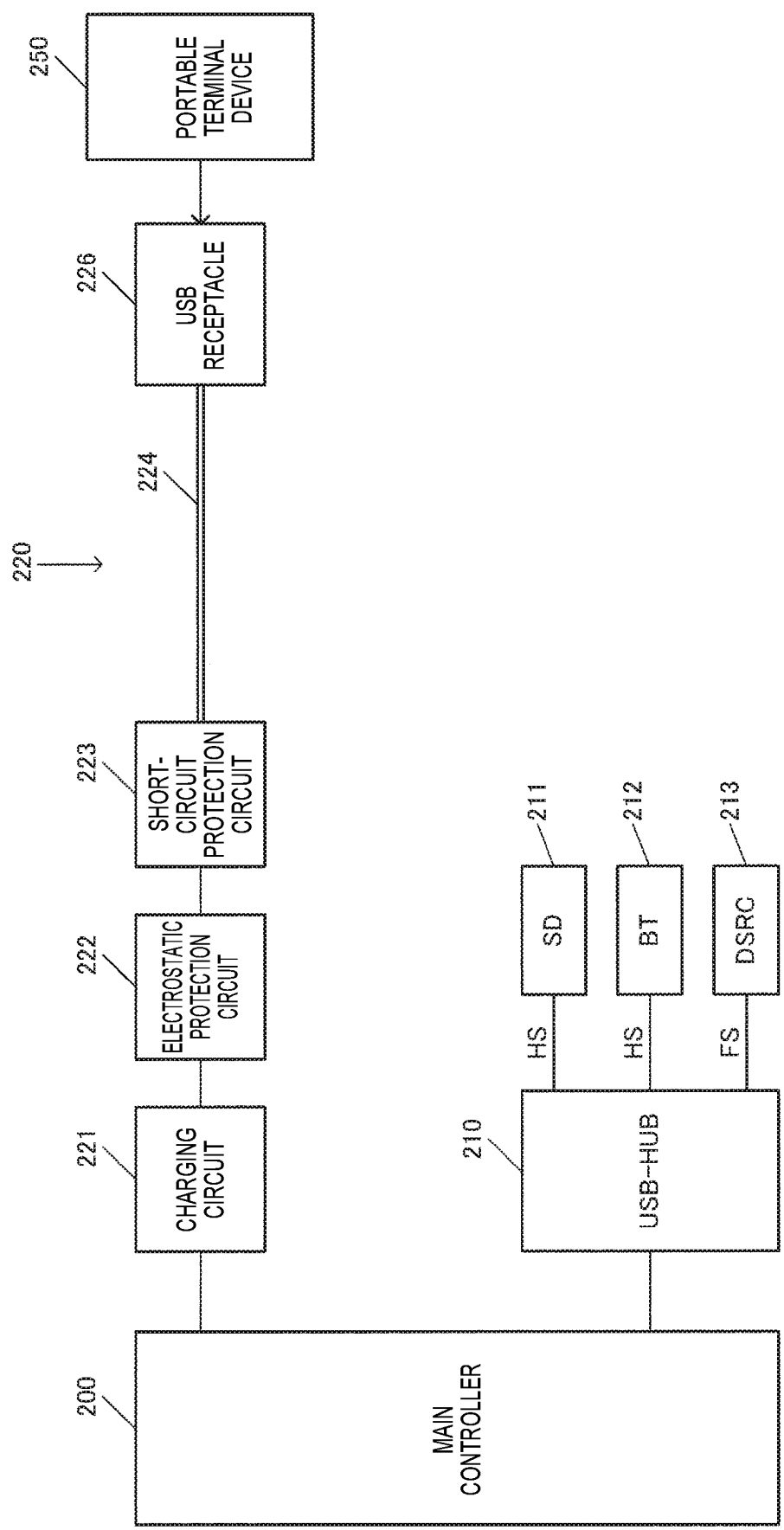
FIG. 1 is an illustrative diagram regarding a problem of degradation in the signal characteristics of a transmission signal.

Degradation in the signal characteristics of transmission signals in USB will be described below with reference to FIG. 1. FIG. 1 shows an example of a vehicle-mounted electronic device system in which a USB-HUB 210 is connected to a main controller 200 that is a host. In one example, an upstream port of the USB-HUB 210 is connected to the main controller 200, and a downstream port is connected to devices such as an SD 211, a BT 212, and a DSRC (dedicated short range communications) 213. The SD 211 is an SD card device, and the BT 212 is a Bluetooth (registered trademark) device. Also, a portable terminal device 250 such as a smartphone is connected to a USB receptacle 226 of a cable harness 220 that has a cable 224. A charging circuit 221, an electrostatic protection circuit 222, a short-circuit protection circuit 223, and the like are provided between the main controller 200 and the USB receptacle 226.

In FIG. 1, the cable 224 is routed so as to avoid the interior or the like of a vehicle, and therefore the cable tends to be very long, and parasitic capacitance and the like is generated. Furthermore, parasitic capacitance and the like is also generated due to circuits such as the charging circuit 221, the electrostatic protection circuit 222, and the short-circuit protection circuit 223. This parasitic capacitance and the like causes degradation in the signal characteristics of HS transmission signals in an USB of the main controller 200. On the other hand, in a USB authentication test, there are demands that the waveform of a transmission signal does not overlap an eye pattern prohibition region. However, if the signal quality of a transmission signal is degraded due to reasons such as an increase in the length of the cable 224 that is routed in a vehicle in FIG. 1, appropriate signal transfer cannot be realized, and problems of not being able to pass an eye pattern near-end authentication test, for example, occur.

2. Configuration Example of Circuit Device

Figure 2:
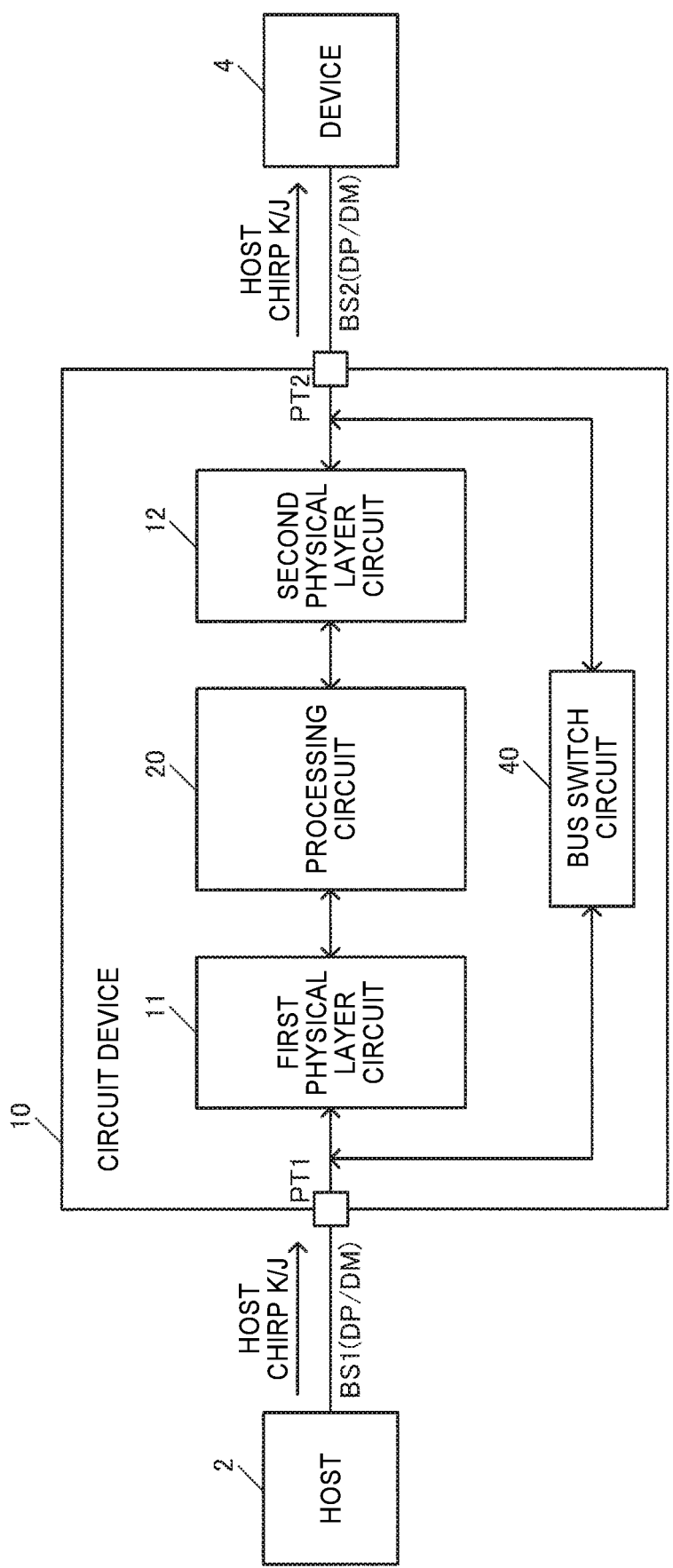
FIG. 2 shows a configuration example of a circuit device according to an embodiment of the invention.

FIG. 2 shows a configuration example of a circuit device 10 of this embodiment. The circuit device 10 includes a first physical layer circuit 11, a second physical layer circuit 12, a processing circuit 20, and a bus switch circuit 40. Note that the circuit device 10 is not limited to the configuration in FIG. 2, and various modifications can be carried out, such as omitting a portion of these constituent elements, or adding other constituent elements.

The first physical layer circuit 11 is connected to a USB-standard first bus BS1. The second physical layer circuit 12 is connected to a USB-standard second bus BS2. The first and second physical layer circuits 11 and 12 are each configured by physical layer analog circuits. Examples of the physical layer analog circuits include drivers that are HS and FS transmission circuits, receivers that are HS and FS reception circuits, various detection circuits, and a pull-up resistance circuit. Note that the processing circuit 20 includes circuits that correspond to the link layer, such as a serial-to-parallel conversion circuit that converts serial data received via USB into parallel data, a parallel-to-serial conversion circuit that converts parallel data into serial data, an elastic buffer, and an NRZI circuit. For example, circuits that correspond to the link layer or the like of a USB transceiver macrocell are included in the processing circuit 20, and analog circuits such as a transmission circuit, a reception circuit, and detection circuits are included in the first and second physical layer circuits 11 and 12.

The first bus BS1 is a bus to which a host is connected, for example, and the second bus BS2 is a bus to which a device is connected, for example. It should be noted that this embodiment is not limited to this connection configuration. The first bus BS1 and the second bus BS2 are USB-standard buses that include signal lines for signals DP (DataPlus) and DM (DataMinus) that are first and second signals constituting differential signals. The first bus BS1 and the second bus BS2 can include power supply VBUS and GND signal lines. The USB standard is broadly a given data transfer standard.

One end of the bus switch circuit 40 is connected to the first bus BS1, and the other end is connected to the second bus BS2. The connection between the first bus BS1 and the second bus BS2 can be switched on or off. In other words, the first bus BS1 and the second bus BS2 are electrically connected or electrically disconnected. Switching on or off the connection between the first bus BS1 and the second bus BS2 is switching on or off, for example, a switch element provided between the DP and DM signal lines of the first bus BS1 and the DP and DM signal lines of the second bus BS2. In addition, connection between circuits and connection between a bus or a signal line and a circuit in this embodiment is electrical connection. Electrical connection is connection that allows transmission of electrical signals, and connection that allows transmission of information using electrical signals. Electrical connection may be connection through a signal line, an active element, and the like.

Specifically, as shown in later-described FIG. 5, the bus switch circuit 40 switches on the connection between the first bus BS1 and the second bus BS2 in a first period T1. More specifically, the bus switch circuit 40 has switch elements provided between the first bus BS1 and the second bus BS2, and the switch elements are switched on in the first period T1. Accordingly, the main controller 200 that is connected to the first bus BS1 and a peripheral device 260 that is connected to the second bus BS2 can directly perform USB signal transfer via USB buses. Note that, as examples of the switch elements, a switch element for signals DP and a switch element for signals DM are provided. In addition, the main controller 200 and the peripheral device 260 are broadly a first device and a second device. Also, as shown in later-described FIG. 6, the bus switch circuit 40 switches off the connection between the first bus BS1 and the second bus BS2 in a second period T2. More specifically, in the second period T2, switch elements provided between the first bus BS1 and the second bus BS2 are switched off. In this second period T2, the processing circuit 20 performs transfer processing that is described below.

The processing circuit 20 is a circuit that performs transfer processing and various types of control processing, and can be realized by, for example, a logic circuit obtained by automatic placement and routing, such as a gate array. Note that the processing circuit 20 may be realized by a processor such as a CPU or an MPU. In the second period T2, the processing circuit 20 performs transfer processing in which packets received from the first bus BS1 via the first physical layer circuit 11 are transmitted to the second bus BS2 via the second physical layer circuit 12, and packets received from the second bus BS2 via the second physical layer circuit 12 are transmitted to the first bus BS1 via the first physical layer circuit 11. For example, the transfer processing is performed at least in a portion of the second period T2. For example, packets are transferred from the first bus BS1 to the second bus BS2 or from the second bus BS2 to the first bus BS1 without changing the packet format. At this time, the processing circuit 20 performs predetermined signal processing in this transfer processing. This predetermined signal processing is signal processing for packet transfer, and is for transferring repeat packets corresponding to received packets. For example, the processing circuit 20 performs predetermined packet bit resynchronization processing as the predetermined signal processing. For example, when a packet is received, the bits in the packet are sampled based on a clock signal generated by the circuit device 10. When a packet is transmitted, the bits in the packet are transmitted in synchronization with a clock signal generated by the circuit device 10. When packet transfer is performed on a transfer route TR2 in FIG. 6 that passes through the processing circuit 20, due to the processing circuit 20 performing predetermined signal processing, it is possible to realize high-quality signal transfer in which degraded signal characteristics of USB transmission signals are improved.

Also, in this embodiment, when a host chirp K/J is detected on the first bus BS1 by the first physical layer circuit 11, the second physical layer circuit 12 outputs a host chirp K/J to the second bus BS2 in a state where connection between the first bus BS1 and the second bus BS2 is switched off by the bus switch circuit 40. In other words, when a host 2 outputs a host chirp K/J to the first bus BS1, the first physical layer circuit 11 detects this host chirp K/J. The second physical layer circuit 12 then outputs, to the second bus BS2, a host chirp K/J that is a repeat signal corresponding to the host chirp K/J detected on the first bus BS1, in the state where connection in the bus switch circuit 40 is off. This host chirp K/J is output by an HS driver of the second physical layer circuit 12. Note that, in this embodiment, the port on the first bus BS1 side is referred to as a "port PT1" that is an INT port, and the port on the second bus BS2 is referred to as a "port PT2" that is an EXT port.

According to this embodiment, in the case where the host 2 outputs a host chirp K/J to the first bus BS1, this host chirp K/J is not transmitted to the second bus BS2 since the connection between the first bus BS1 and the second bus BS2 has been switched off by the switch circuit 40. In place of the host 2, the second physical layer circuit 12 outputs a host chirp K/J to the second bus BS2. Accordingly, a device 4 recognizes this as if the host 2 output the host chirp K/J, and it is possible to appropriately transmit the host chirp K/J from the host 2, to the device 4, and it is possible to shift the device 4 to the HS mode.

In addition, in this embodiment, the host chirp K/J that has been output by the host 2 does not pass through a route including the bus switch circuit 40, and thus it is possible to prevent the occurrence of problems that will be described later with reference to FIGS. 12 and 13. Specifically, it is possible to prevent the occurrence of a problem where a chirp signal deviates from the voltage range of a USB authentication standard, and a problem where the signal voltage of a host chirp K/J becomes significantly unbalanced, due to the on-resistance of the bus switch circuit 40.

Figure 6:
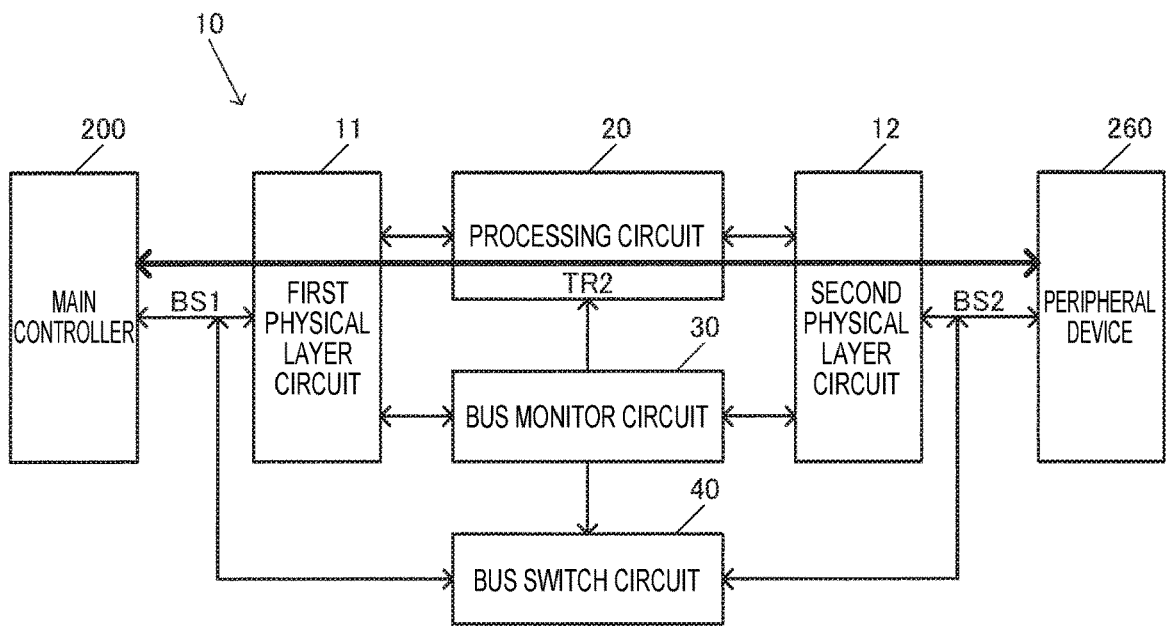
FIG. 6 is an illustrative diagram of operations of the circuit device.

Note that, after the circuit device 10 shifts to the HS mode, packets are transferred on the transfer route TR2 via the first physical layer circuit 11, the processing circuit 20, and the second physical layer circuit 12 as shown in FIG. 6. According to this configuration, it is possible to realize high-quality signal transfer in which degraded signal characteristics of USB transmission signals are improved.

In addition, in this embodiment, in the case where HS termination is detected on the second bus BS2 by the second physical layer circuit 12, the first physical layer circuit 11 switches on HS termination of the first physical layer circuit 11. Specifically, when the second physical layer circuit 12 outputs a host chirp K/J to the second bus BS2 to repeat a host chirp K/J that has been output by the host 2, the device 4 detects this host chirp K/J. After that, as indicated by a timing t7 in later-described FIG. 14, the device 4 that has detected the host chirp K/J switches on an FS driver, and switches on HS termination. Accordingly, the signal amplitude of a chirp signal falls from 800 mV to 400 mV, for example. The second physical layer circuit 12 then detects the HS termination on the second bus BS2 by detecting this fall in the signal amplitude of the chirp signal. Specifically, it is detected that the device 4 that is connected to the second bus BS2 has switched on HS termination. In this embodiment, if HS termination is detected on the second bus BS2 in this manner, HS termination is switched on by the first physical layer circuit 11. Specifically, the first physical layer circuit 11 switches on the FS driver, and switches on HS termination. For example, a resistor that is connected to an output node of the FS driver is caused to function as a terminal resistor so as to switch on HS termination. Accordingly, the host 2 recognizes this as if the device 4 switched on HS termination, and it is possible to shift the host 2 to the HS mode appropriately.

In addition, the first physical layer circuit 11 detects a host chirp K/J on the first bus BS1 in the state where HS termination has been switched off by the first physical layer circuit 11. In other words, the first physical layer circuit 11 detects the host chirp K/J that has been output to the first bus BS1 by the host 2. Moreover, in the case where HS termination is detected on the second bus BS2 by the second physical layer circuit 12, the first physical layer circuit 11 switches on HS termination of the first physical layer circuit 11. Specifically, when a host chirp K/J on the first bus BS1 is detected in the state where HS termination has been switched off by the first physical layer circuit 11, the second physical layer circuit 12 outputs a host chirp K/J, which is a repeat signal, to the second bus BS2. Subsequently, when the device 4 that has detected the host chirp K/J switches on HS termination, the second physical layer circuit 12 detects this HS termination on the second bus BS2, and the first physical layer circuit 11 switches on HS termination. Accordingly, the signal amplitude of a chirp signal on the first bus BS1 also falls from 800 mV to 400 mV, for example. Therefore, it is possible to realize both transmission of a host chirp K/J from the host 2 to the device 4 in the state where HS termination is off and transmission of a host chirp K/J from the host 2 to the device 4 in the state where HS termination is on.

In addition, when a device chirp K is detected on the second bus BS2, the first physical layer circuit 11 outputs a device chirp K to the first bus BS1 in the state where connection between the first bus BS1 and the second bus BS2 has been switched off by the bus switch circuit 40.

For example, when the FS mode is entered as a result of cable attachment, the host 2 switches on the FS driver, and starts a reset. At this time, connection between the first bus BS1 and the second bus BS2 is switched on by the bus switch circuit 40, and the device 4 detects SE0 that has been output by the host 2, via the bus switch circuit 40 that is on. Accordingly, the device 4 outputs a device chirp K to the second bus BS2. The circuit device 10 then detects the device chirp K that has been output to the second bus BS2 by the device 4. For example, a detection circuit 70 in later-described FIG. 3 detects a device chirp K. Alternatively, the second physical layer circuit 12 may detect the device chirp K. If the device chirp K is detected on the second bus BS2 in this manner, the bus switch circuit 40 switches the connection between the first bus BS1 and the second bus BS2 from on to off. Subsequently, in the state where the connection between the first bus BS1 and the second bus BS2 has been switched off by the bus switch circuit 40 in this manner, the first physical layer circuit 11 outputs a device chirp K to the first bus BS1. According to this configuration, the host 2 recognizes this as if the device 4 output the device chirp K, and, after a shift to chirp idle is performed, outputs a host chirp K/J. Therefore, it is possible to cause the host 2 to appropriately output a host chirp K/J for performing a shift from the FS mode to the HS mode. In addition, in this embodiment, the device chirp K that has been output by the device 4 does not pass through a route that includes the bus switch circuit 40, and thus it is possible to prevent the occurrence of a problem that will be described with reference to later-described FIG. 11. Specifically, it is possible to solve, for example, a problem of a decrease in the margin of the operation range of a constant current circuit of the HS driver of the device 4 resulting from the on-resistance of the bus switch circuit 40.

In addition, when a device chirp K is detected on the second bus BS2, the bus switch circuit 40 switches the connection between the first bus BS1 and the second bus BS2 from on to off, and the second physical layer circuit 12 switches on HS termination of the second physical layer circuit 12. As a result of the bus switch circuit 40 switching off the connection in this manner, the device chirp K that has been output to the second bus BS2 by the device 4 is prevented from being transmitted to the first bus BS1 via a route that includes the bus switch circuit 40. Also, as a result of the second physical layer circuit 12 switching on HS termination, a current from the HS driver of the device 4 flows to the terminal resistor of the second physical layer circuit 12, and it is possible to realize appropriate output of the device chirp K by the device 4.

In addition, when stop of output of the device chirp K is detected on the second bus BS2, the first physical layer circuit 11 stops outputting the device chirp K to the first bus BS1. For example, when the device 4 stops outputting the device chirp K, the second physical layer circuit 12 detects this stop of output of the device chirp K. Subsequently, when stop of output of the device chirp K is detected on the second bus BS2, the first physical layer circuit 11 also stops outputting the device chirp K that has been output to the first bus BS1 to repeat the device chirp K. According to this configuration, in conjunction with output of the device chirp K being stopped by the device 4, output of the device chirp K by the first physical layer circuit 11 can also be stopped.

Accordingly, a shift can be performed to a chirp idle state that is a state in which output of a host chirp K/J by the host 2 is waited for.

In addition, when a host chirp K/J is detected on the first bus BS1 by the first physical layer circuit 11 after stop of the device chirp K on the second bus BS2, the second physical layer circuit 12 outputs a host chirp K/J to the second bus BS2. For example, as described above, when the device 4 stops outputting the device chirp K to the second bus BS2, the first physical layer circuit 11 also stops outputting the device chirp K to the first bus BS1 in conjunction with this, and a shift to a USB chirp idle state is performed. After that, in this chirp idle state, when the host 2 outputs a host chirp K/J to the first bus BS1, and the first physical layer circuit 11 detects the host chirp K/J, the second physical layer circuit 12 outputs a host chirp K/J, which is a repeat signal corresponding to the detected host chirp K/J, to the second bus BS2. Accordingly, the device 4 recognizes this as if the host 2 output the host chirp K/J in response to the device chirp K output by the device 4, and it is possible to realize an appropriate handshake of a chirp signal between the host 2 and the device 4.

Figure 3:
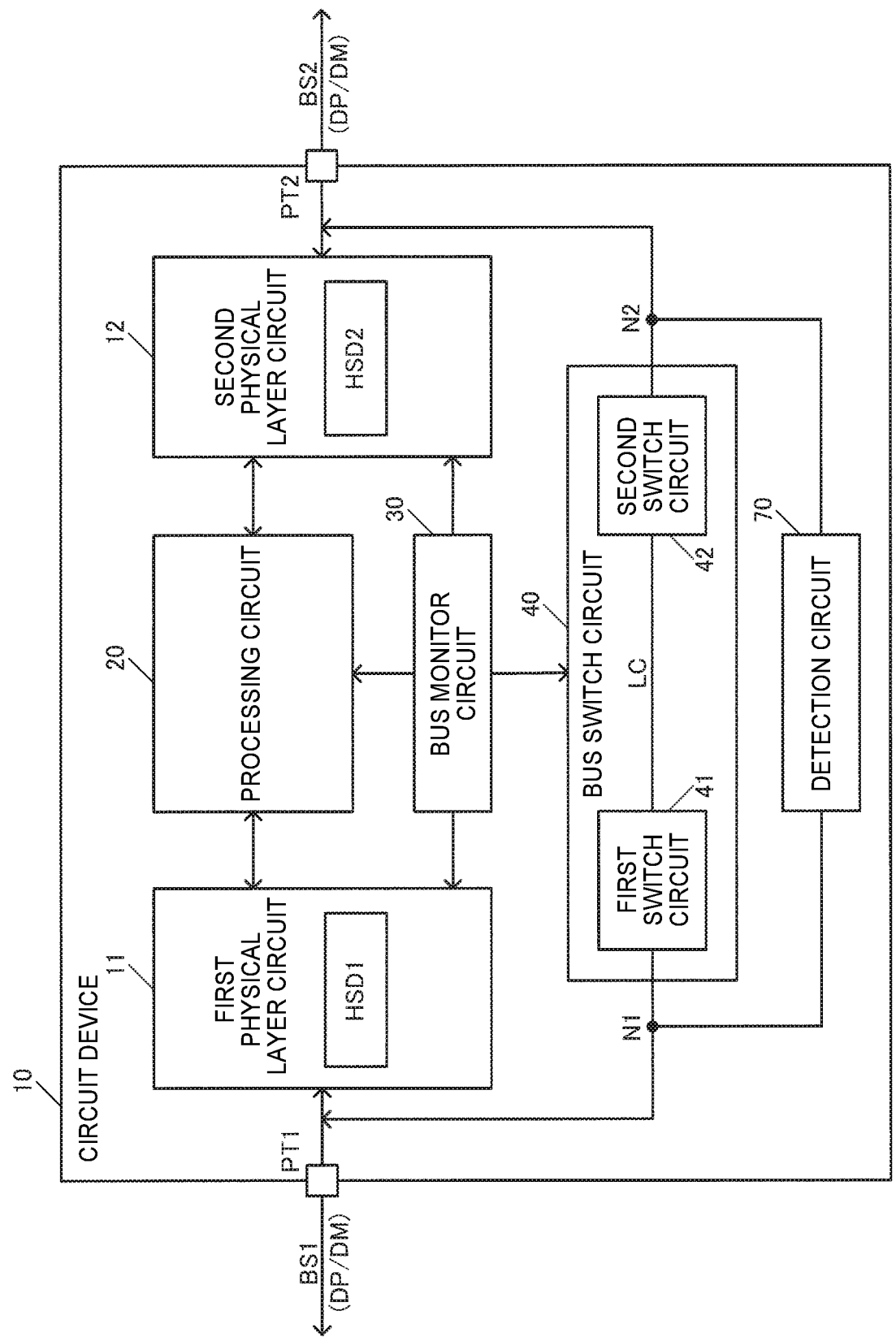
FIG. 3 shows a detailed configuration example of the circuit device.

FIG. 3 shows a detailed configuration example of the circuit device 10. In FIG. 3, the circuit device 10 includes a bus monitor circuit 30. In addition, the bus switch circuit 40 includes a first switch circuit 41 and a second switch circuit 42. The bus monitor circuit 30 performs a monitor operation of monitoring the first bus BS1 and the second bus BS2. For example, this is a monitor operation for monitoring the state of at least one of the first bus BS1 and the second bus BS2. Specifically, the bus monitor circuit 30 performs a monitor operation of monitoring the first bus BS1 or the second bus BS2, using the first physical layer circuit 11 or the second physical layer circuit 12. More specifically, this is a monitor operation for monitoring the state of the first bus BS1 or the second bus BS2 based on signals from the first physical layer circuit 11 or the second physical layer circuit 12. The bus switch circuit 40 then switches on or off the connection between the first bus BS1 and the second bus BS2 based on the monitoring result from the bus monitor circuit 30. For example, based on the monitoring result from the bus monitor circuit 30, the bus switch circuit 40 switches on the connection between the first bus BS1 and the second bus BS2 in the first period T1, and switches off this connection in the second period T2. Also, the processing circuit 20 performs transfer processing shown in FIG. 6 in the second period T2. Accordingly, predetermined signal processing such as packet bit resynchronization processing is executed by the processing circuit 20. In other words, packet repeat processing is performed. Accordingly, it is possible to realize high-quality signal transfer in which degraded signal characteristics of USB transmission signals are improved.

In addition, in FIG. 3, the first physical layer circuit 11 includes a first HS driver HSD1, and the second physical layer circuit 12 includes a second HS driver HSD2. Note that, for ease of description, the first HS driver HSD1 and the second HS driver HSD2 are simply referred to as "HS driver HSD1" and "HS driver HSD2" as appropriate. The HS drivers HSD1 and HSD2 are HS-mode transmission circuits, and drive the DP and DM signal lines of the USB through current driving. The HS drivers HSD1 and HSD2 include a first switch element and a second switch element, and one end of each of these switch elements is connected to a constant current circuit, and each of the other ends is respectively connected to the DP signal line and the DM signal line. In addition, a third switch element that has one end connected to the constant current circuit and another end connected to a VSS line may be included.

In addition, the circuit device 10 in FIG. 3 includes the detection circuit 70 that performs current detection in the bus switch circuit 40. The detection circuit 70 detects which one of the first bus BS1 and the second bus BS2 is a bus on the upstream side, and which one of the first bus BS1 and the second bus BS2 is a bus on the downstream side, for example. In other words, the detection circuit 70 detects that the port PT1 on the first bus BS1 side is an upstream port and the port PT2 on the second bus BS2 side is a downstream port, or that the port PT1 is a downstream port and the port PT2 is an upstream port. Also, the detection circuit 70 detects a device chirp K by performing current detection on the bus switch circuit 40 after USB bus reset.

Specifically, when a current flows from the second bus BS2 to the first bus BS1 via the bus switch circuit 40 after USB bus reset, the detection circuit 70 detects that the first bus BS1 is a bus on the upstream side and the second bus BS2 is a bus on the downstream side. Specifically, in this case, this is because it is conceived that the apparatus on the downstream side output a device chirp K to the second bus BS2, and due to this device chirp K, the current flowed from the second bus BS2 to the first bus BS1 via the bus switch circuit 40. On the other hand, when a current flows from the first bus BS1 to the second bus BS2 via the bus switch circuit 40 after USB bus reset, the detection circuit 70 detects that the first bus BS1 is a bus on the downstream side and the second bus BS2 is a bus on the upstream side. Specifically, in this case, this is because it is conceived that the apparatus on the downstream side output the device chirp K to the first bus BS1, and due to this device chirp K, a current flowed from the first bus BS1 to the second bus BS2 via the bus switch circuit 40.

As described above, the circuit device 10 in FIG. 3 can detect which one of PT1 and PT 2 is an upstream port, and which one of PT1 and PT2 is a downstream port, as a result of the detection circuit 70 being provided in addition to the first physical layer circuit 11, the processing circuit 20, the second physical layer circuit 12, and the bus switch circuit 40. Therefore, it is possible to execute signal transfer and packet transfer on the transfer routes TR1 and TR2 as shown in FIGS. 5 and 6 after appropriately detecting an upstream port and a downstream port, and it is possible to realize appropriate USB signal transfer.

For example, in FIG. 3, a node on the first bus BS1 side relative to the bus switch circuit 40 is denoted by N1, and a node on the second bus BS2 side relative to the bus switch circuit 40 is denoted by N2. In this case, the detection circuit 70 performs processing for detecting an upstream port and a downstream port based on the positive/negative polarity of a voltage difference VDF between a voltage VN1 of the node N1 and a voltage VN2 of the node N2 (VDF=VN1−VN2). Note that, in FIG. 3, the detection circuit 70 detects the voltage difference between two ends of the bus switch circuit 40, but may detect the voltage difference between two ends of the first switch circuit 41, or may detect the voltage difference between two ends of the second switch circuit 42. In other words, the detection circuit 70 detects the voltage difference between the two ends of at least one switch element included in the bus switch circuit 40.

For example, assume that the host 2 is connected to the first bus BS1, and the device 4 is connected to the second bus BS2. In this case, the device 4 connected to the second bus BS2 outputs a device chirp K after bus reset. Therefore, a current flows from the second bus BS2 to the first bus BS1 via the bus switch circuit 40. Specifically, a current from the HS driver of the device 4 flows from the second bus BS2 into the terminal resistor of the host 2 that is connected to the first bus BS1, through the bus switch circuit 40 that is on. When such a current flows, the voltage difference VDF (=VN1−VN2) occurs between the node N1 and the node N2 due to the on-resistance of the bus switch circuit 40. The direction of the current in this case is a direction from the node N2 to the node N1, and thus the polarity of the voltage difference VDF is negative. Therefore, as a result of the detection circuit 70 detecting that the absolute value of the voltage difference VDF exceeds a predetermined threshold voltage value, and the polarity of the voltage difference VDF is negative, it is possible to detect that the device 4 connected to the second bus BS2 has output a host chirp K. In other words, it is possible to detect that the first bus BS1 is a bus on the upstream side, and the second bus BS2 is a bus on the downstream side.

On the other hand, in the case where the apparatus connected to the first bus BS1 has output a device chirp K to the first bus BS1 as a role of a device, a current flows from the first bus BS1 to the second bus BS2 via the bus switch circuit 40. If such a current flows, a voltage difference VDF that has a positive polarity occurs due to the on-resistance of the bus switch circuit 40. Therefore, in the case where the detection circuit 70 detects that the absolute value of the voltage difference VDF exceeds the predetermined threshold voltage value, and the polarity of the voltage difference VDF is positive, it is detected that the first bus BS1 is a bus on the downstream side, and the second bus BS2 is a bus on the upstream side. By using the detection circuit 70 having the above-described configuration, it is possible to appropriately detect an upstream port and a downstream port with a configuration that has a small number of circuits.

In addition, assume that the detection circuit 70 detected that a current flowed from the second bus BS2 to the first bus BS1 via the bus switch circuit 40 after USB bus reset. In this case, the first physical layer circuit 11 outputs a device chirp K to the first bus BS1. For example, the first physical layer circuit 11 outputs a device chirp K to the first bus BS1 assuming that a device chirp K was detected on the second bus BS2. Specifically, in the case where the detection circuit 70 detects that a current flowed from the second bus BS2 to the first bus BS1 via the bus switch circuit 40 after USB bus reset, the detection circuit 70 detects that the port PT1 on the first bus BS1 side is an upstream port and the port PT2 on the second bus BS2 side is a downstream port. Also, in the case where the detection circuit 70 detects that the above-described absolute value of the voltage difference VDF exceeds the predetermined threshold voltage value, it is possible to detect that a current resulting from a device chirp K having been output to the second bus BS2 is flowing to the bus switch circuit 40. Therefore, the first physical layer circuit 11 outputs, to the first bus BS1, a device chirp K that is a repeat signal corresponding to the device chirp K that has been output to the second bus BS2. Also, when the detection circuit 70 detects flow of a current from the second bus BS2 to the first bus BS1 via the bus switch circuit 40, the bus switch circuit 40 switches the connection between the first bus BS1 and the second bus BS2 from on to off. In addition, the second physical layer circuit 12 switches on HS termination of the second physical layer circuit 12. As a result of the bus switch circuit 40 switching off the connection in this manner, the device chirp K that has been output by the device 4 is not transmitted to the first bus BS1 via a route including the bus switch circuit 40. Also, as a result of the second physical layer circuit 12 switching on HS termination, it is possible to realize appropriate output of a device chirp K by the device 4.

On the other hand, assume that the detection circuit 70 detects flow of a current from the first bus BS1 to the second bus BS2 via the bus switch circuit 40 after USB bus reset. In this case, the second physical layer circuit 12 outputs a device chirp K to the second bus BS2. For example, the second physical layer circuit 12 outputs a device chirp K to the second bus BS2, assuming that a device chirp K was detected on the first bus BS1. Specifically, in the case where the detection circuit 70 detects the flow of a current from the first bus BS1 to the second bus BS2 via the bus switch circuit 40 after USB bus reset, the detection circuit 70 detects that the port PT1 on the first bus BS1 is a downstream port, and the port PT2 on the second bus BS2 side is an upstream port. Also, in the case where the detection circuit 70 detects that the above-described absolute value of the voltage difference VDF exceeds the predetermined threshold voltage value, it is possible to detect that a current resulting from a device chirp K that has been output to the first bus BS1 is flowing to the bus switch circuit 40. Therefore, the second physical layer circuit 12 outputs, to the second bus BS2, a device chirp K that is a repeat signal corresponding to the device chirp K output to the first bus BS1. In addition, when the detection circuit 70 detects the flow of a current from the first bus BS1 to the second bus BS2 via the bus switch circuit 40, the bus switch circuit 40 switches the connection between the first bus BS1 and the second bus BS2 from on to off. In addition, the first physical layer circuit 11 switches on HS termination of the first physical layer circuit 11. Also, when a host chirp K/J is detected on the second bus BS2 by the second physical layer circuit 12, the first physical layer circuit 11 outputs a host chirp K/J to the first bus BS1 in the state where the connection is switched off by the bus switch circuit 40. In the case where HS termination is detected on the first bus BS1 by the first physical layer circuit 11, the second physical layer circuit 12 switches on HS termination of the second physical layer circuit 12.

As described above, in this embodiment, the detection circuit 70 detects which one of the ports PT1 and PT2 is an upstream port and which one of the ports PT1 and PT2 is a downstream port. After the detection circuit 70 performs the detection, the bus switch circuit 40 switches off the connection between the first bus BS1 and the second bus BS2, and the circuit device 10 performs a USB signal repeat operation. In this repeat operation, if a signal such as a USB chirp signal is detected on one of the first bus BS1 and the second bus BS2, the circuit device 10 outputs a repeat signal corresponding to the detected signal to the other bus. For example, assume that the detection circuit 70 detected that one of the first bus BS1 and the second bus BS2 is a bus on the upstream side, and the other bus is a bus on the downstream side. At this time, when a device chirp signal K is detected on the other bus that is a bus on the downstream side, the circuit device 10 outputs a repeat signal corresponding to the device chirp K, to the bus on the upstream side. Also, when a host chirp signal K/J is detected on the bus on the upstream side, the circuit device 10 outputs a repeat signal corresponding to the host chirp K/J to the other bus on the downstream side. At the time of this USB signal repeat operation, the connection between the first bus BS1 and the second bus BS2 is switched off by the bus switch circuit 40. Moreover, when transferring HS packets after a handshake resulting from this USB signal repeat operation, repeat processing of HS packets on the transfer route TR2 in FIG. 6 is performed. By performing the USB signal repeat operation and HS packet repeat processing in this manner, USB signal characteristics can be improved.

Also, in FIG. 3, the bus switch circuit 40 includes the first switch circuit 41, the second switch circuit 42, and the signal line LC. One end of the first switch circuit 41 is connected to the first bus BS1, and the first switch circuit 41 is switched on in the first period T1 and switched off in the second period T2. The first switch circuit 41 is constituted by a first switch element for signals DP and a second switch element for signals DM, for example. One end of the first switch element is connected to the DP signal line of the first bus BS1, and the other end is connected to a DP signal line of the signal line LC. One end of the second switch element is connected to the DM signal line of the first bus BS1, and the other end is connected to a DM signal line of the signal line LC. These first and second switch elements are switched on in the first period T1 and off in the second period T2.

One end of the second switch circuit 42 is connected to the second bus BS2, and the second switch circuit 42 is switched on in the first period T1 and off in the second period T2. The second switch circuit 42 is constituted by a third switch element for signals DP and a fourth switch element for signals DM, for example. One end of the third switch element is connected to the DP signal line of the second bus BS2, and the other end is connected to the DP signal line of the signal line LC. One end of the fourth switch element is connected to the DM signal line of the second bus BS2, and the other end is connected to the DM signal line of the signal line LC. These third and fourth switch elements are switched on in the first period T1 and off in the second period T2.

The first and second switch elements that constitute the first switch circuit 41 and the third and fourth switch elements that constitute the second switch circuit 42 may be constituted by transfer gates, for example, but are desirably constituted by N-type transistors. For example, these switch elements are constituted by MOS transistors. According to this configuration, it is possible to reduce parasitic capacitance due to drain capacitance and source capacitance of the transistor. In addition, a switch signal generation circuit that has a charge pump circuit that performs a charge pump operation based on a charge pump clock signal may be provided in the circuit device 10. The switch signal generation circuit generates a switch signal based on a boosted power supply voltage that was boosted by the charge pump circuit, and supplies the switch signal to the bus switch circuit 40. For example, the switching on and off of the first to fourth switch elements of the bus switch circuit 40 is controlled using a switch signal generated based on a boosted power supply voltage. If a switch signal that is based on a boosted power supply voltage is used in this manner, it is possible to lower on-resistance of a transistor that constitutes a switch element of the bus switch circuit 40, and it is possible to appropriately switch on or off the switch element.

One end of the signal line LC is connected to the other end of the first switch circuit 41 and the other end of the signal line LC is connected to the other end of the second switch circuit 42. It can be said that the signal line LC is a bypass signal line between the first bus BS1 and the second bus BS2. For example, the signal line LC has a DP signal line, which is connected to the DP signal line of the first bus BS1 via the first switch circuit 41, and is connected to the DP signal line of the second bus BS2 via the second switch circuit 42. In addition, the signal line LC has a DM signal line, which is connected to the DM signal line of the first bus BS1 via the first switch circuit 41, and is connected to the DM signal line of the second bus BS2 via the second switch circuit 42.

By providing two switch circuits in the bus switch circuit 40 in this manner, it is possible to reduce parasitic capacitance resulting from wiring capacitance. For example, by providing the first switch circuit 41 and the second switch circuit 42 in the bus switch circuit 40, it is possible to shorten the wiring length of a first signal line that connects the bus switch circuit 40 and the first bus BS1 and a second signal line that connects the bus switch circuit 40 and the second bus BS2. Accordingly, it is possible to reduce parasitic capacitance resulting from the wiring capacitance of these signal lines. For example, in the second period T2 in which connection by the bus switch circuit 40 is switched off, high-speed HS communication is performed as will be described later. Therefore, if the wiring capacitance of the first signal line that connects the first bus BS1 and the bus switch circuit 40 and the second signal line that connects the second bus BS2 and the bus switch circuit 40 is large, HS communication is negatively affected.

In this regard, in FIG. 3, the first switch circuit 41 and the second switch circuit 42 are provided in the bus switch circuit 40, and thus, a layout arrangement of the first switch circuit 41 and the second switch circuit 42 that shortens the above-described first and second signal lines is possible. Accordingly, it is possible to reduce the wiring capacitance of the first signal line and the second signal line, and it is possible to reduce the negative influence that the wiring capacitance of these signal lines has on HS communication in the second period T2. In addition, due to the wiring length of the first and second signal lines being shortened, the wiring length of the signal line LC is increased accordingly, and the wiring capacitance of the signal line LC increases. However, in the second period T2 during which high-speed HS communication is performed, when the first switch circuit 41 and the second switch circuit 42 are switched off, the signal line LC is electrically disconnected from the first bus BS1 and the second bus BS2. Therefore, even if the wiring length of the signal line LC increases and the wiring capacitance of the signal line LC increases, no significant problem occurs. Therefore, according to the circuit device 10 in this embodiment, it is possible to reduce the wiring capacitances of the first signal line that connects the first bus BS1 and the bus switch circuit 40 and the second signal line that connects the second bus BS2 and the bus switch circuit 40, and it is possible to prevent degradation in the signal characteristics due to this wiring capacitance or the like.

Figure 4:
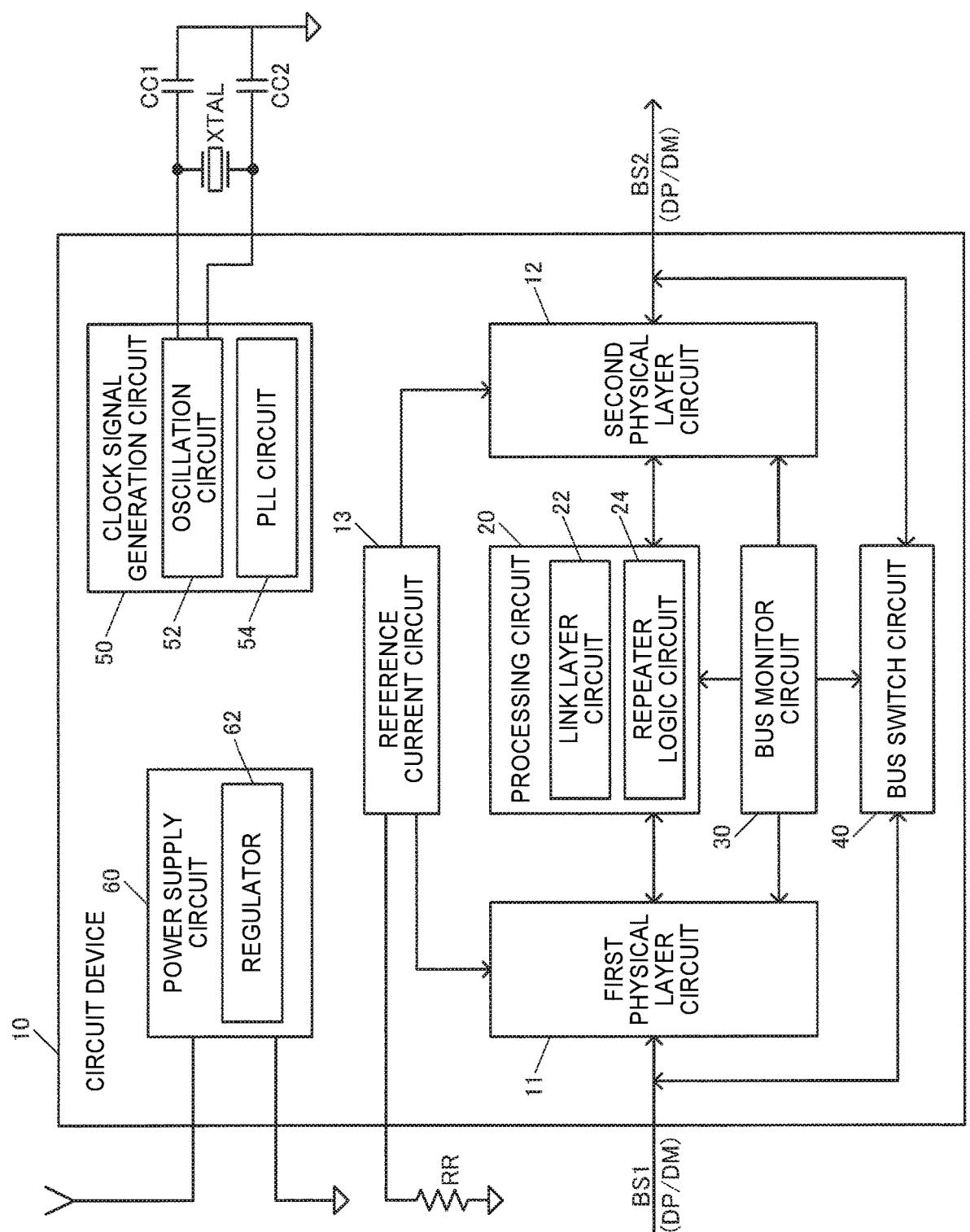
FIG. 4 shows a specific configuration example of the circuit device.

FIG. 4 shows a specific configuration example of the circuit device 10. In FIG. 4, the circuit device 10 further includes a reference current circuit 13, a clock signal generation circuit 50, and a power supply circuit 60. The reference current circuit 13 is a circuit for generating a reference current used in the first and second physical layer circuits 11 and 12, and generates a reference current by using a resistor RR that is an external component. The clock signal generation circuit 50 is a circuit that generates various types of clock signals used in the circuit device 10, and includes an oscillation circuit 52 and a PLL circuit 54. The oscillation circuit 52 is connected to an oscillator XTAL and capacitors CC1 and CC2, which are external components. The oscillator XTAL is realized by a quartz resonator or the like. The oscillation circuit 52 performs an oscillation operation of the oscillator XTAL, and generates a clock signal based on an oscillation signal. The PLL circuit 54 generates a multiphase clock signal based on a generated clock signal. The power supply circuit 60 receives a voltage from an external power supply, and generates various types of power supply voltages for use in the circuit device 10. Specifically, a regulator 62 of the power supply circuit 60 regulates the voltage from the external power supply, generates a power supply voltage that is lower than the voltage from the external power supply, and supplies the generated power supply voltage to various circuit blocks of the circuit device 10.

The processing circuit 20 includes a link layer circuit 22, a repeater logic circuit 24, and the like. The link layer circuit 22 is a circuit that performs processing that corresponds to the link layer. The link layer circuit 22 performs serial-to-parallel conversion processing for converting serial data received via the USB into parallel data, parallel-to-serial conversion processing for converting parallel data into serial data for transmission, processing for NRZI encoding and decoding, and the like. The repeater logic circuit 24 performs logic processing for transmitting packets received from the first bus BS1 to the second bus BS2, and transmitting packets received from the second bus BS2 to the first bus BS1. For example, the bits of a received packet are sampled using a clock signal, and serial data obtained by the sampling is converted into parallel data. Also, parallel data that has been subjected to various types of logic processing such as NRZI is converted into serial data and transmitted in synchronization with a clock signal in the circuit device 10. According to this configuration, predetermined signal processing such as packet bit resynchronization processing (resynchronization) is realized.

Figure 5:
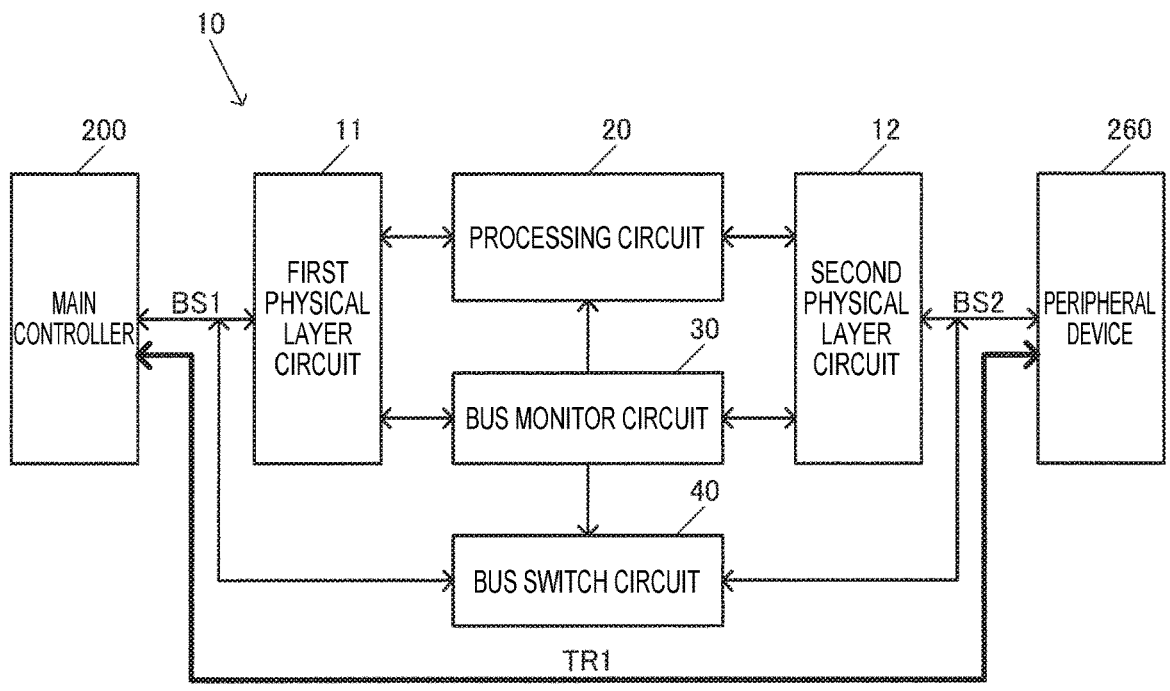
FIG. 5 is an illustrative diagram of operations of the circuit device.

FIGS. 5 and 6 are illustrative diagrams of operations of the circuit device 10 of this embodiment. As shown in FIG. 5, in the first period T1, the bus switch circuit 40 switches on the connection between the first bus BS1 and the second bus BS2. For example, when a switching control signal from the bus monitor circuit 30 becomes active, the switch elements respectively provided in correspondence with the DP and DM signal lines are switched on, and the first bus BS1 and the second bus BS2 become electrically connected. Accordingly, the main controller 200 connected to the first bus BS1 and the peripheral device 260 connected to the second bus BS2 are able to perform USB signal transfer on a transfer route TR1 that includes the first bus BS1, the bus switch circuit 40, and the second bus BS2. In other words, it is possible to perform signal transfer by using signals DP and DM. On the other hand, as shown in FIG. 6, in the second period T2 after the first period T1, the bus switch circuit 40 switches off the connection between the first bus BS1 and the second bus BS2. For example, when a switching control signal from the bus monitor circuit 30 becomes inactive, the switch elements respectively provided in correspondence with signals DP and DM are switched off, and the first bus BS1 and the second bus BS2 become electrically disconnected. In this second period T2, the processing circuit 20 performs transfer processing for transferring packets between the first bus BS1 and the second bus BS2 via the first and second physical layer circuits 11 and 12. In other words, packet transfer processing is performed on the transfer route TR2. For example, in the second period T2, when a transfer processing instruction signal from the bus monitor circuit 30 becomes active, the processing circuit 20 starts packet transfer processing on the transfer route TR2. In this transfer processing, predetermined signal processing such as packet bit resynchronization processing is performed, and an improvement in signal quality is realized.

As described above, in this embodiment, the circuit device 10 is provided with the processing circuit 20 that transfers packets between the first bus BS1 and the second bus BS2 via the first and second physical layer circuits 11 and 12, the bus monitor circuit 30 that monitors the buses, and the bus switch circuit 40 that switches on and off the connection between the first bus BS1 and the second bus BS2 based on a monitoring result. According to this configuration, for example, even if the signal characteristics of signals on the first bus BS1 and the second bus BS2 has degraded, the degraded signal characteristics can be improved by performing predetermined signal processing such as packet bit resynchronization processing on the transfer route TR2 in FIG. 6.

For example, if the cable 224 is long as shown in FIG. 1, or a large parasitic capacitance or parasitic resistance exists on the transfer route, there is a problem that the signal characteristics degrade a large amount, and appropriate signal transfer cannot be realized. In view of this, if the circuit device 10 of this embodiment is arranged between the main controller 200 and the portable terminal device 250, which is the peripheral device 260, it is possible to improve the degraded signal characteristics. Accordingly, it is possible to realize appropriate signal transfer between the main controller 200 and the portable terminal device 250.

Note that the USB-HUB 210 shown in FIG. 1 has a product ID and a vender ID in accordance with the USB standard. In contrast, the circuit device 10 of this embodiment does not have such a product ID or vender ID, and the circuit device 10 of this embodiment is different from the USB-HUB 210 in this respect.

Also, as a circuit device for improving degraded signal characteristics, there is also a circuit device called a redriver that uses an analog circuit to perform amplitude adjustment and eye adjustment for the signals DP and DM. However, a redriver does not perform packet transfer on the transfer route TR2 shown in FIG. 6, and therefore cannot improve the signal characteristic of degraded signals with resynchronization processing, and thus is different from the circuit device 10 of this embodiment in this respect.

Also, the peripheral device 260 in FIGS. 5 and 6 may be able to switch between the role of the host and the role of the device, as with CarPlay and USB OTG (On-The-GO). For example, assume that the portable terminal device 250 in FIG. 1 is the peripheral device 260 that can perform CarPlay or the like. In this case, a technique is conceivable in which a USB-HUB for improving degraded signal characteristics is arranged between the main controller 200 and the peripheral device 260. However, in the case where the peripheral device 260 is the host, the host peripheral device 260 is connected to the downstream port of the USB-HUB, and there is a problem that appropriate packet transfer cannot be realized. In view of this, the circuit device 10 of this embodiment has an advantage in that, unlike the USB-HUB, even in the case where the role of the peripheral device 260 connected to the second bus BS2 in FIGS. 5 and 6 for example is switched to the role of the host, it is possible to handle this case. For example, it is sufficient that switch processing and setting processing regarding the host and device roles is performed in the first period T1. After it has been determined that the role of the peripheral device 260 is the host or the device, it is sufficient to perform packet transfer on the transfer route TR2 in the second period T2 as shown in FIG. 6. Accordingly, with the technique of this embodiment, there is an advantage that even if the peripheral device 260 is a CarPlay device for example, it is possible to realize appropriate packet transfer.

Figure 7:
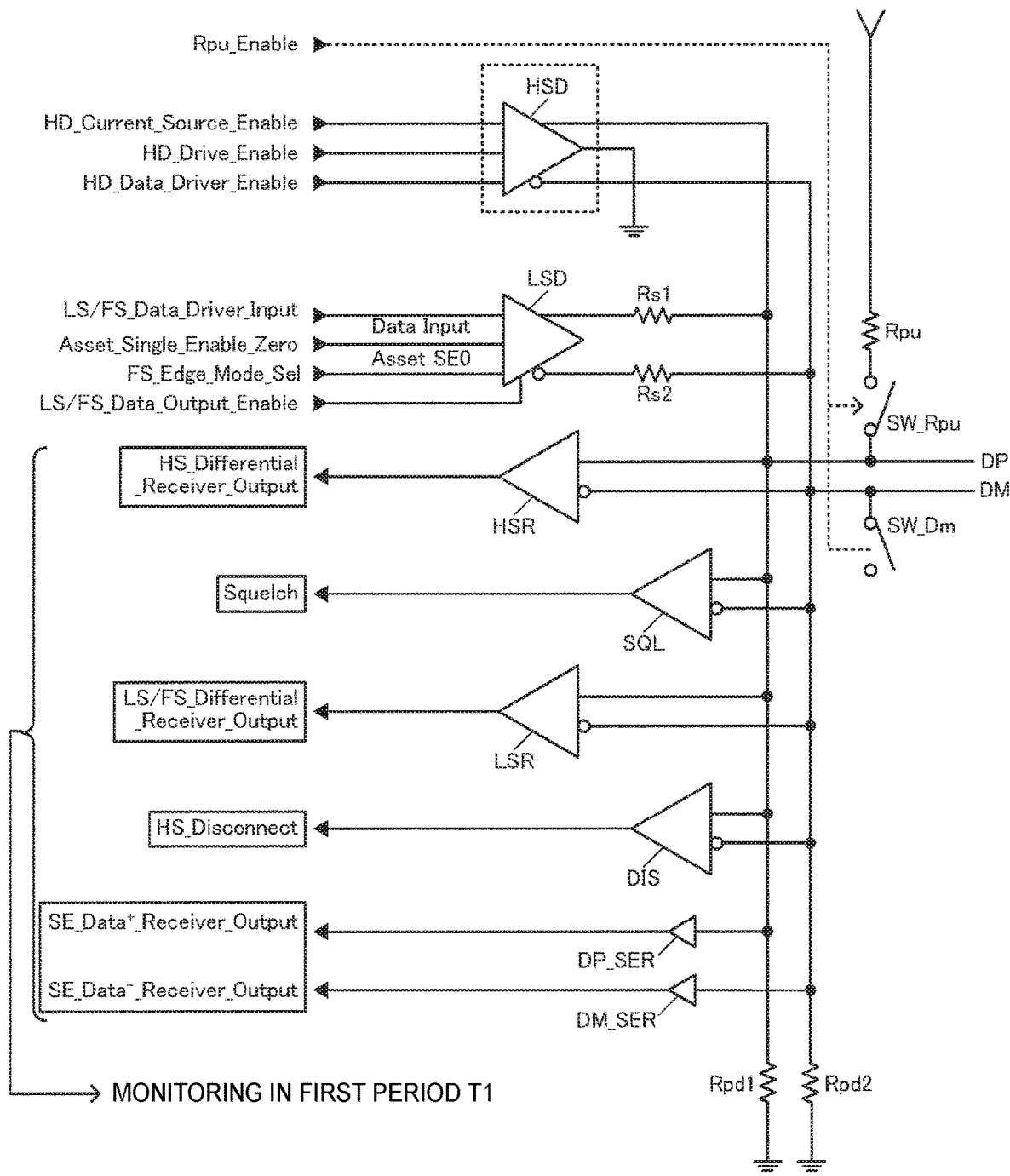
FIG. 7 shows a configuration example of a physical layer circuit.

Next, a physical layer circuit will be described in detail. FIG. 7 shows a configuration example of a physical layer circuit. Here, the first physical layer circuit 11 and the second physical layer circuit 12 are collectively referred to as "physical layer circuits". Each physical layer circuit includes a pull-up resistor Rpu, switch elements SW_Rpu and SW_Dm, and pulldown resistors Rpd1 and Rpd2. The switch element SW_Rpu is switched on or off based on a control signal Rpu_Enable. This realizes a pull-up operation. In addition, each physical layer circuit includes an HS driver HSD that is a HS transmission circuit, an LS/FS driver LSD that is an LS/FS transmission circuit, and resistors Rs1 and Rs2. The HS driver HSD is a current driver that performs current driving, and the LS/FS driver LSD is a voltage driver that performs voltage driving. At the time of HS termination, by the driver LSD outputting an L level, the resistors Rs1 and Rs2 function as terminating resistors of 45Ω. When HS termination is disabled, output of the driver LSD enters a high impedance state. Note that an LS driver and an FS driver can be separately provided as the LS/FS driver LSD, for example.

In addition, each physical layer circuit includes an HS receiver HSR that is an HS differential reception circuit, a transmission envelope detector SQL that is a squelch detection circuit, a receiver LSR that is an LS/FS differential reception circuit, a disconnection envelope detector DIS that is a disconnection detection circuit, and single end receivers DP_SER and DM_SER that are single-end reception circuits.

In addition, in this embodiment, a bus monitor operation is performed by the bus monitor circuit 30 based on a signal from an analog circuit that constitutes a physical layer circuit. Specifically, as shown in FIG. 7, for example, the bus monitor circuit 30 performs a bus monitor operation based on signals from the HS receiver HSR, the squelch transmission envelope detector SQL, the LS/FS receiver LSR, the disconnection envelope detector DIS for disconnection detection, or the single end receivers DP_SER and DM_SER. Specifically, the bus monitor circuit 30 can monitor states of a bus such as a device chirp K, a host chirp K/J, idle, reset, suspend, resume, SE0, J, K, bus reset, or HS disconnection, based on signals from these analog circuits. The bus monitor circuit 30 then controls switching on or off of connection of the bus switch circuit 40 and controls switching on or off of transfer processing of the processing circuit 20, based on the monitoring result. According to this configuration, it is possible to realize appropriate switch control of the bus switch circuit 40 and transfer control of the processing circuit 20 that are based on the monitoring result of the bus states.

Figure 8:
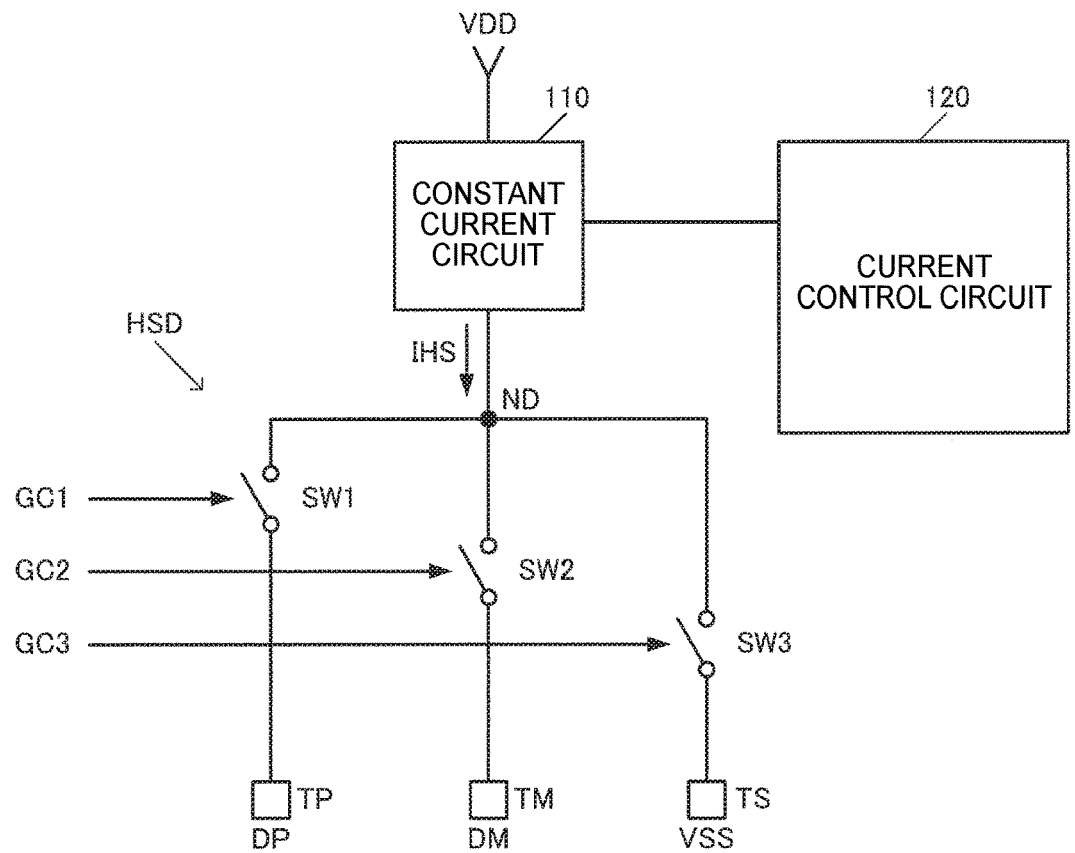
FIG. 8 shows a configuration example of an HS driver.

FIG. 8 shows a configuration example of the HS driver HSD. This HS driver HSD corresponds to the HS drivers HSD1 and HSD2 in FIG. 3. The HS driver HSD includes a DP switch element SW1 and a DM switch element SW2. In addition, a VSS switch element SW3 can be further included. The switch element SW1 is provided between a node ND to which a current IHS from a constant current circuit 110 is supplied and a terminal TP of a signal DP, and the switching on and off of the switch element SW1 is controlled based on a control signal GC1. The switch element SW2 is provided between the node ND and a terminal TM of a signal DM, and switching on and off of the switch element SW2 is controlled based on a control signal GC2. The switch element SW3 is provided between the node ND and a VSS terminal TS, and the switching on and off of the switch element SW3 is controlled based on a control signal GC3. The constant current circuit 110 is provided between a VDD node and the node ND, and supplies a current IHS whose current value is set by a current control circuit 120.

The HS driver HSD in FIG. 8 current-drives the DP and DM signal lines of the USB bus via the switch element SW1 or the switch element SW2 using the current IHS from the constant current circuit 110. Specifically, when the control signal GC1 becomes active, the switch element SW1 is switched on, and the current IHS from the constant current circuit 110 flows to the DP signal line side via the switch element SW1. When the control signal GC2 becomes active, the switch element SW2 is switched on, and the current IHS from the constant current circuit 110 flows to the DM signal line side via the switch element SW2. Here, terminating resistors are connected to the DP and DM signal lines. Therefore, when the control signal GC1 becomes active, and the control signal GC2 becomes inactive, a J state occurs in which the voltage of the signal DP is 400 mV, and the voltage of the signal DM is 0 V. When the control signal GC1 becomes inactive, and the control signal GC2 becomes inactive, a K state occurs in which the voltage of the signal DP is 0 V, and the voltage of the signal DM is 400 mV. By bringing the USB bus state into the J state or the K state using the control signals GC1 and GC2 in this manner, it is possible to perform data transfer via the USB. Note that, in a period other than an HS transmission period, when the control signal GC3 becomes active, the current IHS from the constant current circuit 110 flows to the VSS side via the switch element SW3.

3. USB Signal Repeat Operation

Figure 9:
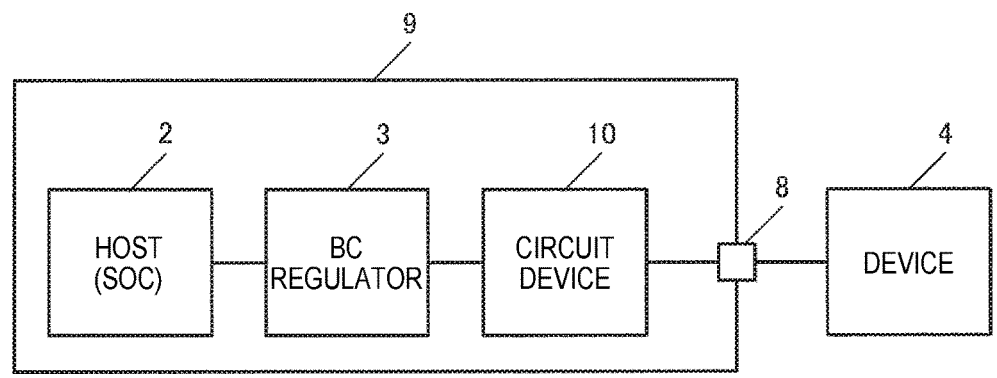
FIG. 9 is an illustrative diagram regarding degradation in signal characteristics resulting from on-resistance.

FIG. 9 shows an example of a system substrate 9 on which the circuit device 10 of this embodiment is implemented. The host 2 that is realized by an SOC (System-on-a-Chip), a BC regulator 3, and the circuit device 10 are implemented on the system substrate 9. In addition, the device 4 is connected to a USB receptacle 8 provided on the system substrate 9, via a USB cable. The host 2 is the main controller 200, for example, and the device 4 is the peripheral device 260 such as the portable terminal device 250, for example.

The BC regulator 3 is a regulator that complies with the USB BC (battery charging specification). The BC regulator 3 performs communication with the device 4 that requires large-capacity charging such as a smartphone or a tablet PC, based on a BC-dedicated protocol using dedicated hardware, sets a power supply amount thereafter, and supplies power to a VBUS power source. For this reason, the BC regulator 3 has a switch circuit therein, and after performing communication with the device 4 based on the BC protocol, switches on the switch circuit so as to make a switch to a route that includes the host 2. Thus, a configuration is adopted in which, on the system substrate 9, a plurality of switch circuits are arranged in series on a USB bus route between the host 2 and the device 4. For example, if the circuit device 10 of this embodiment is arranged between the host 2 and the device 4 as shown in FIG. 9, a configuration is acquired in which the switch circuit of the BC regulator 3 and the bus switch circuit 40 of the circuit device 10 of this embodiment are arranged in series on the USB bus route between the host 2 and the device 4. Here, the on-resistance of the bus switch circuit 40 is about 5 to 10Ω, for example. In addition, if other circuit devices such as the BC regulator 3 are arranged between the host 2 and the device 4, the on-resistances of the switch circuits of these other circuit devices are also added to the on-resistance of the bus switch circuit 40. Therefore, the following problem occurs.

Figure 10:
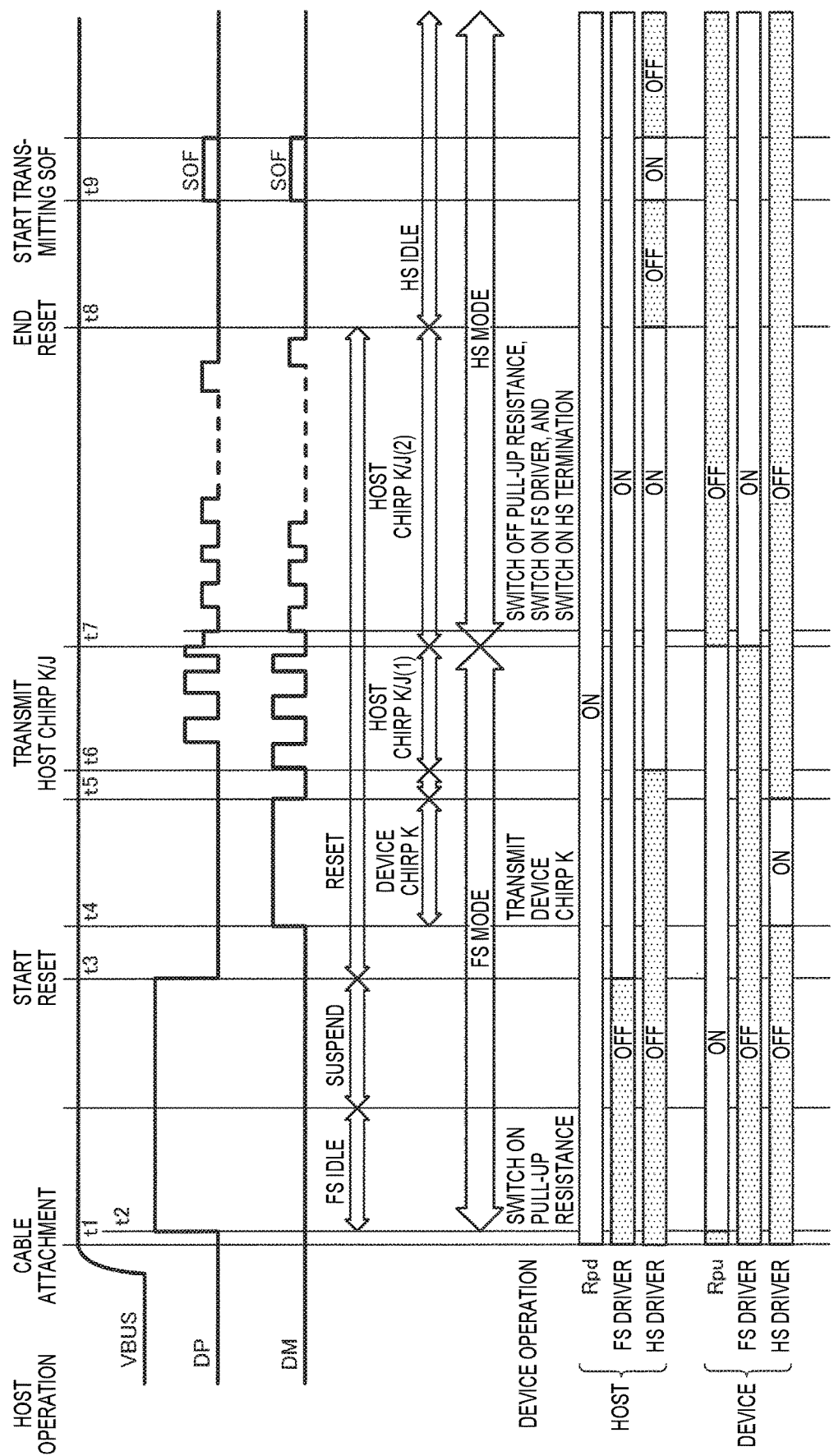
FIG. 10 is a signal waveform diagram illustrating a shift sequence from FS to HS of a USB.

First, in the LS mode and the FS mode, USB communication is performed through voltage driving, and thus even if the bus switch circuit 40 is inserted on the USB bus route, essentially no problem occurs. In the LS mode and the FS mode, communication is performed through voltage driving, and it is sufficient that a signal at an H level or L level, which are voltage levels, is propagated at a predetermined timing, and the transfer speed is 15 Mbps or smaller, and thus no problem occurs. In addition, in the circuit device 10 of this embodiment, during HS packet communication, packets are transferred on the transfer route TR2 in FIG. 6, and signals do not pass through the transfer route TR1 of the bus switch circuit 40, and thus no problem occurs. A problem occurs during HS handshake for performing a shift from FS to HS. First, USB HS handshake will be described. FIG. 10 is a signal waveform diagram illustrating the sequence of an HS handshake for performing a shift from FS to HS of the USB.

As shown in FIG. 10, after cable attachment (timing t1), as a result of the pull-up resistor Rpu being switched on by the device that detected that the VBUS has changed to H level, the voltage of the signal DP is pulled up, and a shift to an FS mode is performed (t2). In other words, a shift to FS idle is performed, and if nothing happens for a certain period of time, a shift to a suspend state is performed. Next, the host switches on the FS driver, and starts a reset (t3). A terminating resistor of 45Ω is connected to an output node of the FS driver, and when the FS driver is switched on and an L level is output, the voltage of the pulled-up signal DP falls to the L level, and SE0 that causes the signals DP and DM to change to the L level is output. When SE0 of 2.5 μs or more is detected, the device determines that reset is to be performed, switches on the HS driver, and transmits the device chirp K (t4) for a certain period (1 to 7 ms). When the certain period has elapsed, the device switches off the HS driver, and stops the device chirp K (t5), and this starts chirp idle. During chirp idle, the FS driver of the host is on, and thus both the signals DP and DM change to the L level. When the device chirp K is detected, the host switches on the HS driver, and transmits the host chirp K/J (t6). In FIG. 10, the host chirp K/J before a shift to the HS mode is performed is indicated as the host chirp K/J(1). The device recognizes that the host is compatible with the HS mode by detecting the host chirp K/J(1), switches off the pull-up resistor Rpu, switches on the FS driver, and switches on HS termination (t7). Accordingly, the amplitude of the signals DP and DM drop from 800 mV to 400 mV, and a shift to the HS mode is performed. In FIG. 10, the host chirp K/J after a shift to the HS mode is performed is indicated as the host chirp K/J(2). During the host chirp K/J(2), the FS drivers of both the host and the device are on, a current from the HS driver of the host flows to terminating resistors of these FS drivers. After that, when the host switches off the HS driver and ends the reset (t8), a shift to HS idle is performed, and the host starts SOF transmission (t9). During HS idle, the FS drivers of both the host and the device are switched on, and buses enter an SE0 state. The host switches on the HS driver periodically in a cycle of 125 μs, and transmits SOF.

Figure 11:
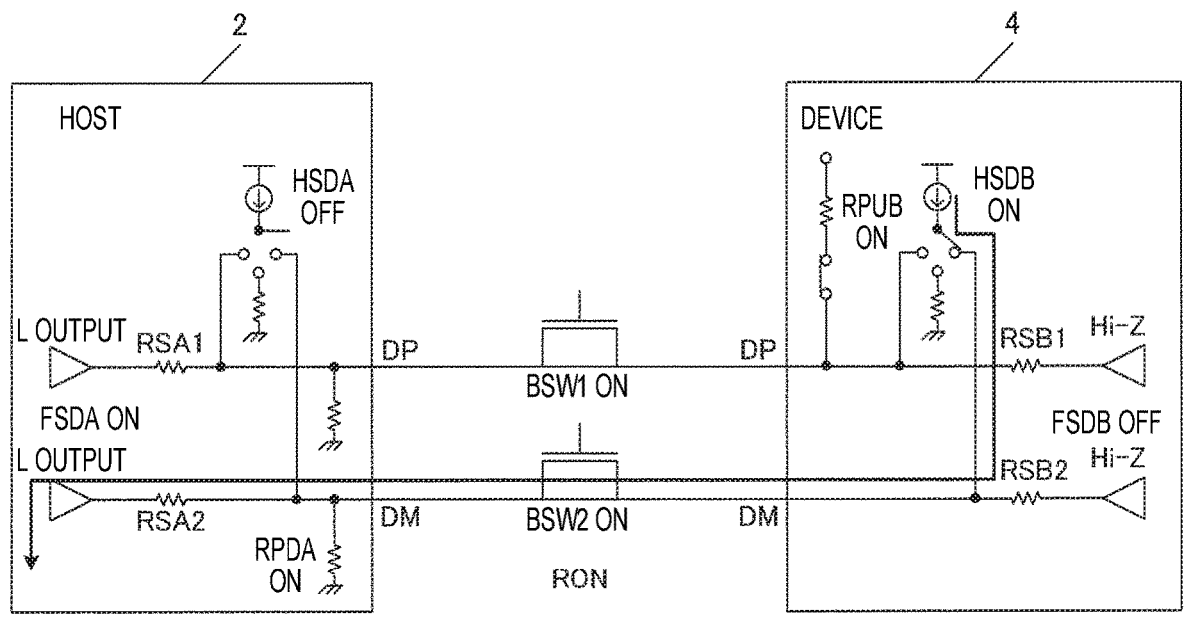
FIG. 11 is an illustrative diagram of a device chirp K.

FIG. 11 is an illustrative diagram of a device chirp K. In FIG. 11, BSW1 and BSW2 denote switch elements that constitute the bus switch circuit 40, for example, and RON denotes on-resistance thereof. As described above, the on-resistance RON is about 5 to 10Ω, for example. In addition, if other circuit devices such as the BC regulator 3 are arranged between the host 2 and the device 4 as shown in FIG. 9, the on-resistances of switch circuits of these other circuit devices are added to this on-resistance RON. The host 2 is provided with an HS driver HSDA, an FS driver FSDA, resistors RSA1 and RSA2 that function as terminal resistors, and a pull-down resistor RPDA. The device 4 is provided with an HS driver HSDB, an FS driver FSDB, resistors RSB1 and RSB2 that function as terminal resistors, and a pull-up resistor RPUB. The HS drivers HSDA and HSDB output a constant current of 17.78 mA. The resistance value of the resistors RSA1, RSA2, RSB1 and RSB2 is 45Ω. The resistors RSA1, RSA2, RSB1, and RSB2 function as terminal resistors in HS.

During the device chirp K in FIG. 11, the HS driver HSDB of the device 4 is switched on. Specifically, the switch element SW2 for signals DM in FIG. 8 is switched on. Also, the FS driver FSDA of the host 2 is switched on. Specifically, a state where the FS driver FSDA outputs a signal at an L level is entered. Accordingly, a current of 17.78 mA from the constant current circuit of the HS driver HSDB flows into the resistor RSA2 of the host 2 via the USB and the switch element BSW2. In this case, the signal amplitude of a signal DM in the host 2 is 17.78 mA×45Ω=800 mV, and is not affected by the on-resistance RON. Note that a problem where the margin of the operation range of the constant current circuit of the HS driver HSDB of the device 4 decreases by a voltage of 17.78 mA×RON due to the on-resistance RON occurs.

Figure 12:
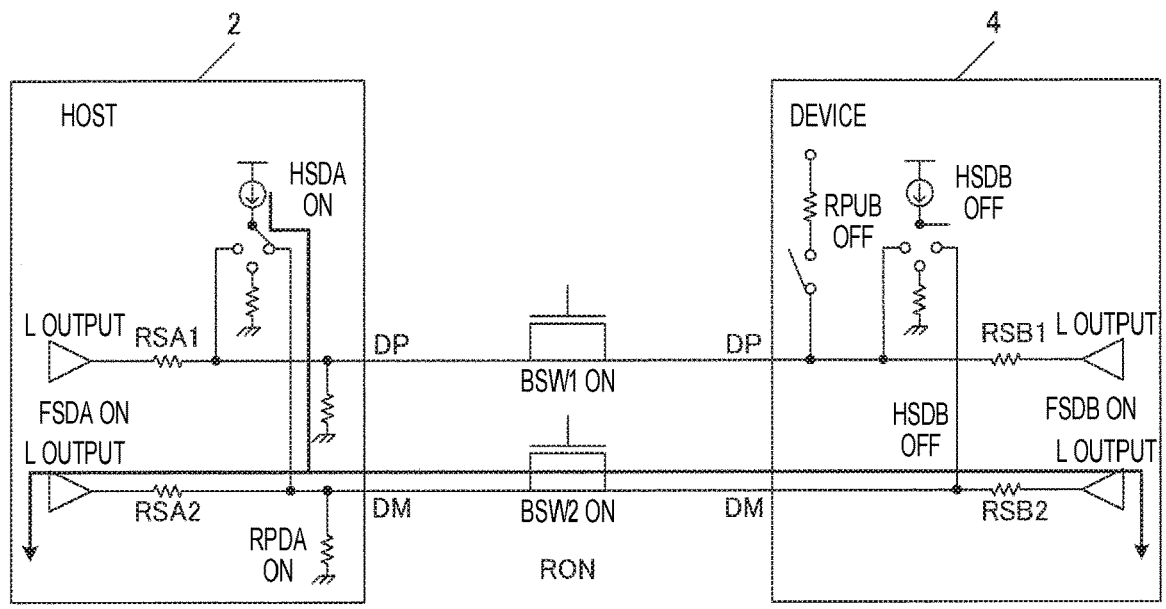
FIG. 12 is an illustrative diagram of a host chirp K/J.
Figure 13:
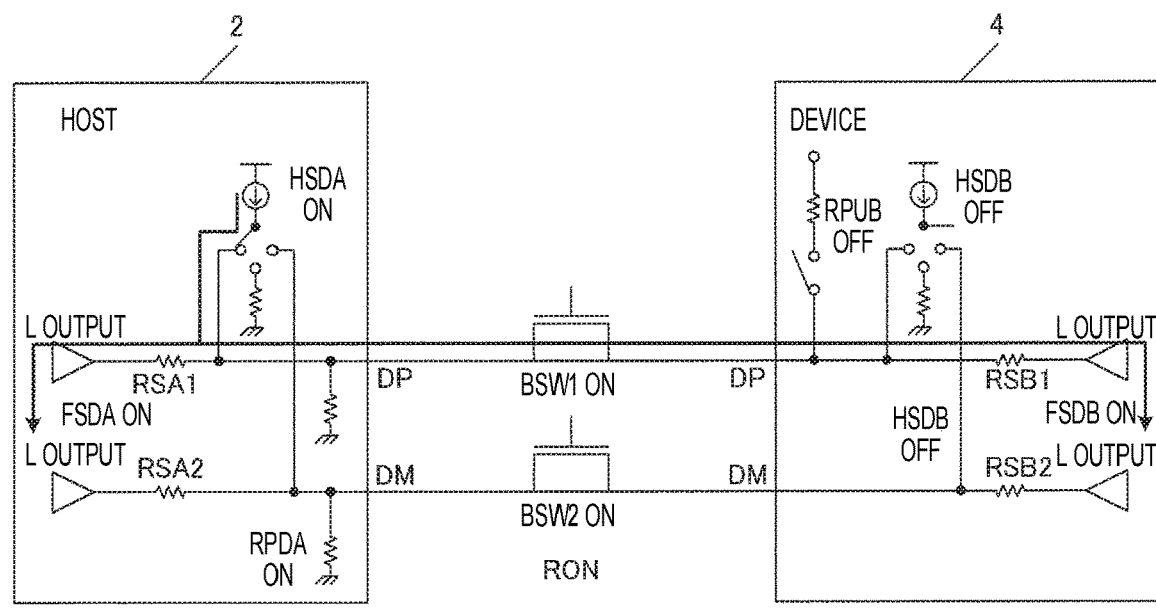
FIG. 13 is an illustrative diagram of a host chirp K/J.

FIGS. 12 and 13 are illustrative diagrams of a host chirp K/J. The host chirps K/J in FIGS. 12 and 13 correspond to a host chirp K/J(2) after the timing t7 that comes after a shift to the HS mode is performed in FIG. 10. At the time of the host chirp K in FIG. 12, the HS driver HSDA of the host 2 is switched on. Specifically, the switch element SW2 for signals DM in FIG. 8 is switched on. Also, the FS driver FSDA of the host 2 and the FS driver FSDB of the device 4 are switched on. Accordingly, a current from the HS driver HSDA flows to the resistor RSA2 of the host 2, and flows to the resistor RSB2 of the device 4 via the USB and the switch element BSW2. At the time of the host chirp J in FIG. 13, the HS driver HSDA of the host 2 is switched on. Specifically, the switch element SW1 for signals DP in FIG. 8 is switched on. Also, the FS driver FSDA of the host 2 and the FS driver FSDB of the device 4 are switched on. Accordingly, a current from the HS driver HSDA flows to the resistor RSA1 of the host 2, and flows to the resistor RSB1 of the device 4 via the USB and the switch element BSW1. Here, the voltage range of the chirp K/J is stipulated as a range from −900 mV to −500 mV regarding a chirp K in accordance with the USB 2.0 standard, and is stipulated as a range from 700 mV to 1100 mV regarding a chirp J. Moreover, on the host 2 side, the voltage range of the chirp K/J can be within this voltage range, but, on the device 4 side, the on-resistance RON of the switch elements BSW1 and BSW2 is a very large constraint.

For example, if 17.78 mA×45 0=800 mV, a DP or DM signal amplitude VAH on the host side at the time of a host chirp K/J can be expressed as $\{(RON+45)/(RON+90)\} \times 800$ mV. A DP or DM signal amplitude VAD on the device side can be expressed as $\{45/(RON+90)\} \times 800$ mV. For example, if RON is 10Ω, the signal amplitude VAH on the host side is 440 mV, and the signal amplitude VAD on the device side is 360 mV. If RON is 45Ω, the signal amplitude VAH on the host side is 533 mV, and the signal amplitude VAD on the device side is 266 mV. In this manner, the voltage becomes largely unbalanced due to the on-resistance RON, and deviates largely from the specifications of the voltage range of a chirp signal.

As described above, a situation occurs in which a chirp signal deviates from the voltage range of the authentication standard due to the on-resistance of the switch elements. In addition, there is a possibility that the signal voltage of a host chirp K/J will become largely unbalanced due to the on-resistance, causing the problem of a reception error. In addition, due to the on-resistance RON, the margin of the operation range of the constant current circuit of the HS driver decreases. Also, if a switch circuit of another circuit device such as the BC regulator 3 is coupled on the USB bus route between the host 2 and the device 4 in addition to the bus switch circuit 40, the above-described on-resistance further increases, and there is a risk that the problem of an operation failure will be caused by the on-resistance.

In order to solve the above-described problem, in this embodiment, the circuit device 10 performs a repeat operation of causing a physical layer circuit to repeat a USB signal. Specifically, the detection circuit 70 detects which one of the ports PT1 and PT2 is an upstream port, and which one is a downstream port. For example, the voltage difference between two ends of the bus switch circuit 40 and the current direction are detected by the detection circuit 70. For example, in the case where the detection circuit 70 detects that an HS current has been flowing to the bus switch circuit 40 for a certain period, the direction in which the HS current is flowing is also detected. Here, assume that the detection circuit 70 detected that the port PT1 is an upstream port and the port PT2 is a downstream port, and the device 4 has output a device chirp K to the second bus BS2. In this case, the bus switch circuit 40 switches off the connection between the first bus BS1 and the second bus BS2. The first physical layer circuit 11 then outputs a repeat signal corresponding to the device chirp K, to the first bus BS1 to which the host 2 is connected. Then, when the first physical layer circuit 11 detects the voltage of a host chirp K/J from the host 2, HS termination of the first physical layer circuit 11 is switched on so as to allow communication of the host chirp signal K/J between the host 2 and the circuit device 10. Also in the second physical layer circuit 12, the HS driver is started, and a repeat signal corresponding to the host chirp K/J is transmitted to the device 4 on the second bus BS2. When the host chirp K/J from the second physical layer circuit 12 is detected, the device 4 switches on HS termination, and performs a shift to the HS mode. According to this configuration, the host 2, the device 4, and the circuit device 10 shift to the HS mode. According to the circuit device 10 of this embodiment having this configuration, the above-described problem regarding on-resistance does not occur in an HS chirp signal, and stable communication is possible.

Figure 14:
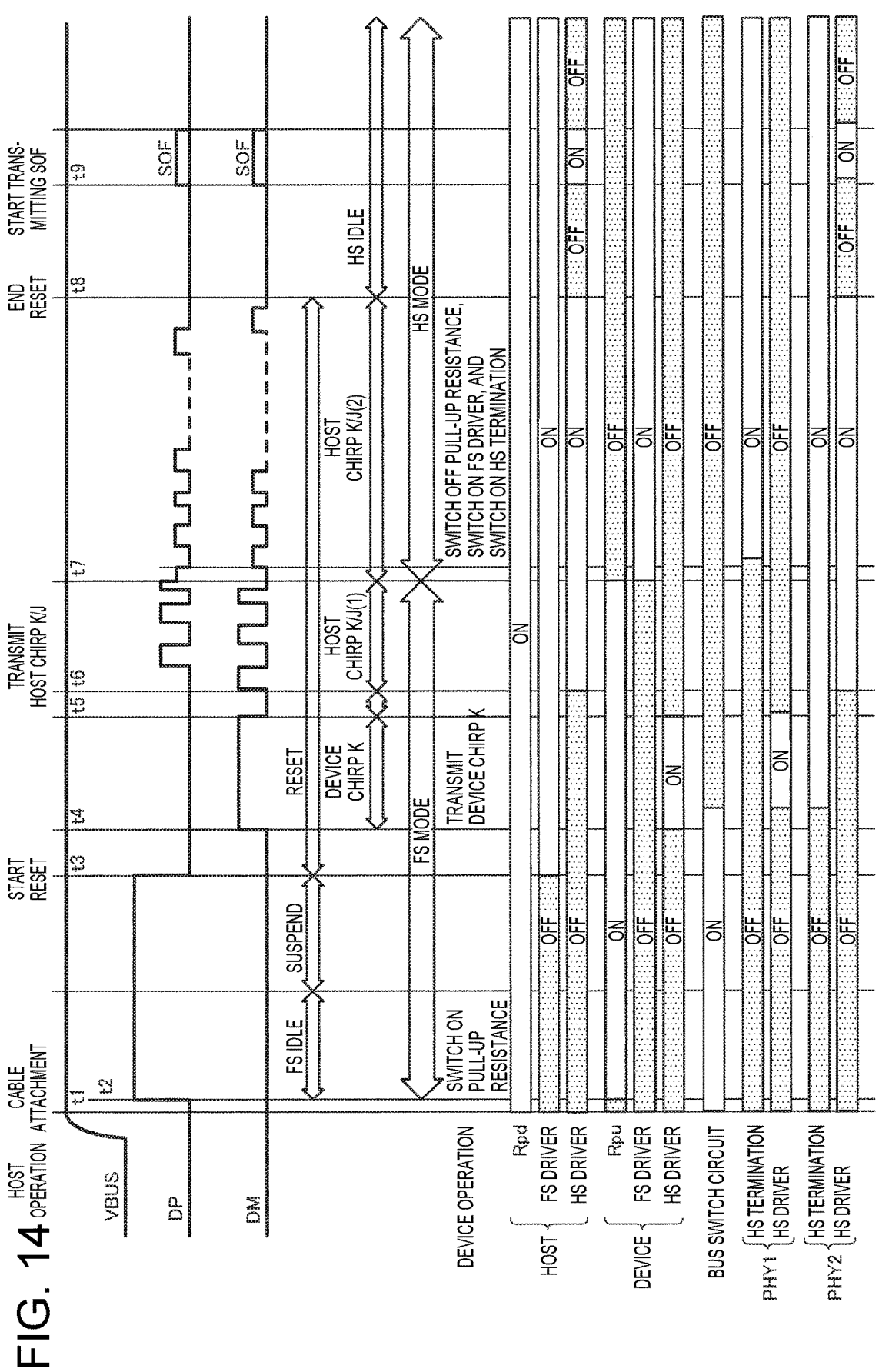
FIG. 14 is a signal waveform diagram illustrating detailed operations of the circuit device.

FIG. 14 is a signal waveform diagram illustrating overall operations of the circuit device 10 of this embodiment. The upper portion in FIG. 14 is similar to that in FIG. 10. In the lower portion in FIG. 14, an on/off sequence of the bus switch circuit 40 is shown. In addition, HS termination of the first physical layer circuit 11 and an on/off sequence of an HS driver are shown in the PHY1 portion in the lower portion in FIG. 14, and HS termination of the second physical layer circuit 12 and an on/off sequence of an HS driver are shown in the PHY2 portion. FIGS. 15 to 20 are diagrams illustrating operations at timings in the sequence in FIG. 14 in detail. Operations in this embodiment will be described below in detail with reference to FIG. 14 as appropriate, in addition to FIGS. 15 to 20. Here, a case will be described in which the host 2 is connected to the first bus BS1, and the device 4 is connected to the second bus BS2. In this case, the port PT1 on the first bus BS1 side is an upstream port, and the port PT2 on the second bus BS2 side is a downstream port.

Figure 15:
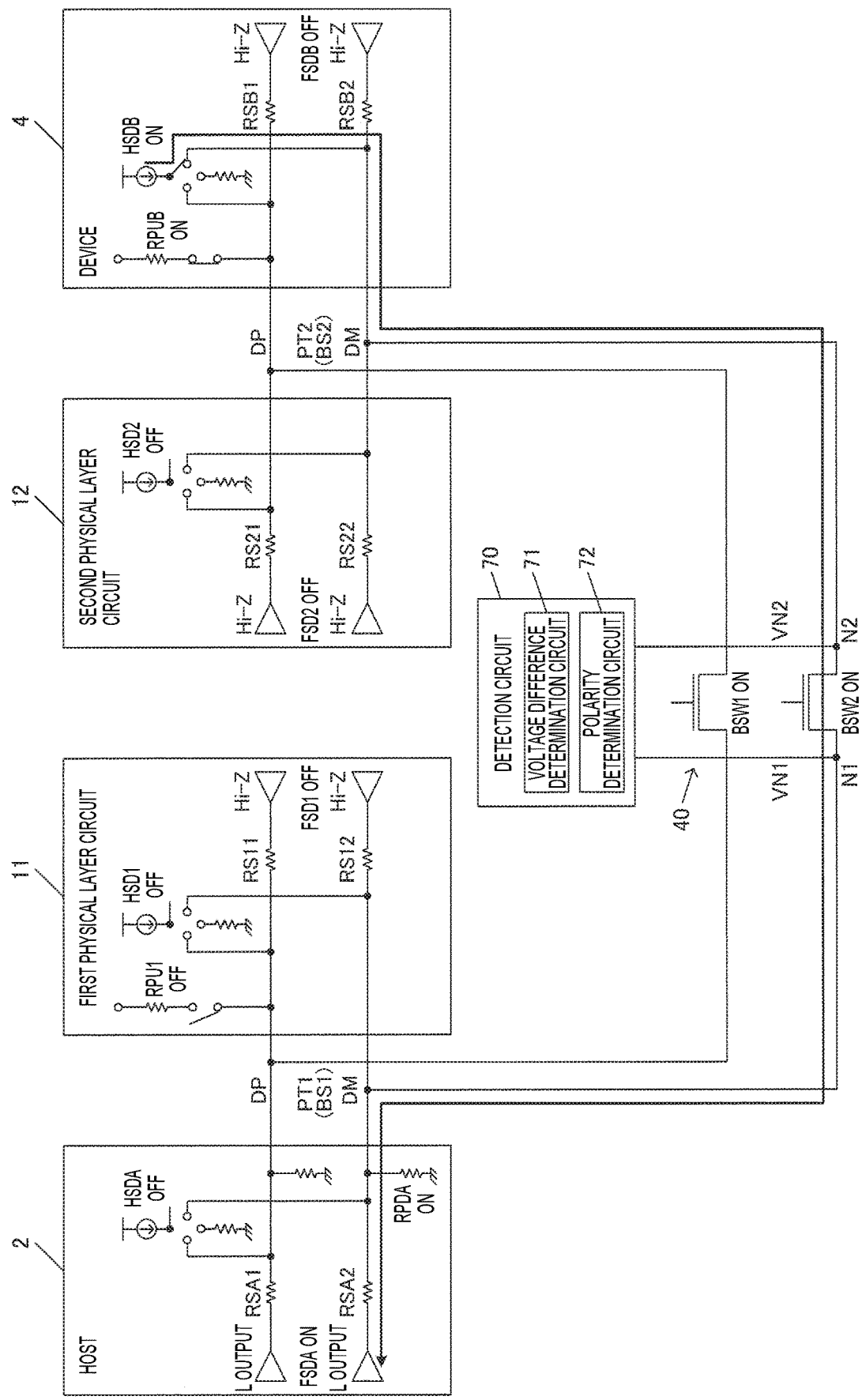
FIG. 15 is an illustrative diagram of detailed operations of this embodiment in a shift sequence from FS to HS.
Figure 16:
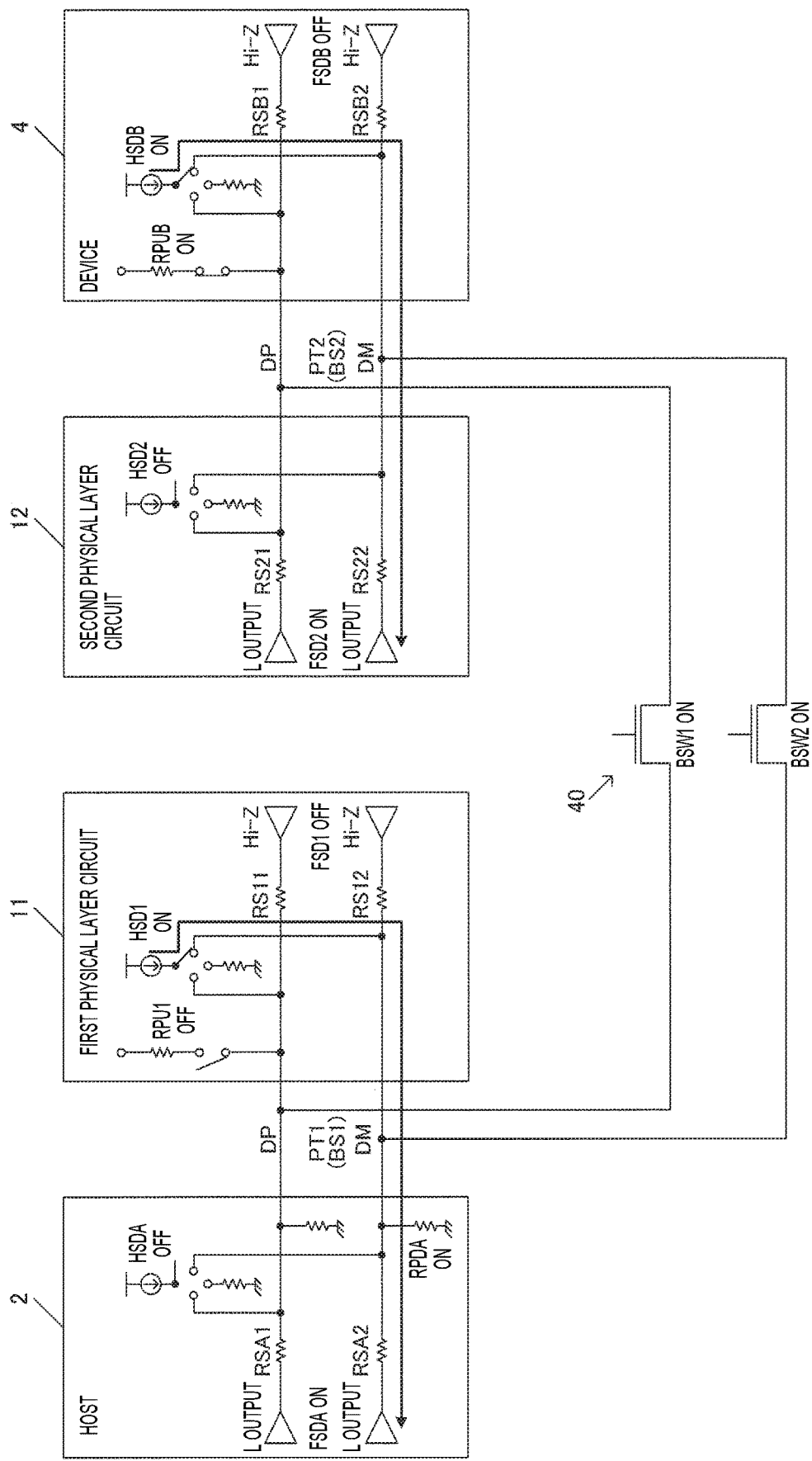
FIG. 16 is an illustrative diagram of detailed operations of this embodiment in a shift sequence from FS to HS.

FIGS. 15 and 16 are illustrative diagrams of operations of the circuit device 10 of this embodiment during a device chirp K. As shown in FIGS. 15 and 16, the first physical layer circuit 11 is provided with the HS driver HSD1, an FS driver FSD1, resistors RS11 and RS12 that function as terminal resistors, and a pull-up resistor RPU1. The second physical layer circuit 12 is provided with the HS driver HSD2, an FS driver FSD2, and resistors RS21 and RS22 that function as terminal resistors. The configurations of the host 2 and the device 4 are similar to those in FIG. 11, and thus a description thereof is omitted. In addition, the detection circuit 70 includes a voltage difference determination circuit 71 and a polarity determination circuit 72.

In FIG. 14, after cable attachment, when the host 2 starts reset, the device 4 transmits a device chirp K. At the timing when the device 4 starts transmitting the device chirp K, connection between the first bus BS1 and the second bus BS2 is switched on by the bus switch circuit 40 as shown in FIG. 14. In other words, the switch elements BSW1 and BSW2 of the bus switch circuit 40 are on as shown in FIG. 15. Also, during the device chirp K, the HS driver HSDB of the device 4 is switched on. Specifically, the switch element SW2 for signals DM in FIG. 8 is switched on. In addition, the host 2 switches on the FS driver. Accordingly, a current from the HS driver HSDB of the device 4 flows into the resistor RSA2 of the host 2 via the switch element BSW2 of the bus switch circuit 40.

When this current from the HS driver HSDB flows to the switch element BSW2 of the bus switch circuit 40, the voltage difference VDF (=VN1−VN2) occurs between the voltage VN1 of the node N1 and the voltage VN2 of the node N2 due to the on-resistance of the switch element BSW2. In FIG. 15, since a current flows from the second bus BS2 to the first bus BS1, VN1 is smaller than VN2, and the polarity of the voltage difference VDF is negative. The voltage difference determination circuit 71 of the detection circuit 70 determines whether or not the absolute value |VDF| of the voltage difference VDF exceeds a threshold voltage value Vth. In other words, whether or not |VDF| is larger than Vth is determined. The polarity determination circuit 72 of the detection circuit 70 determines whether the polarity of the voltage difference VDF is positive or negative. In other words, whether VN1 is larger than VN2 or VN1 is smaller than VN2 is determined. For example, when a current that is caused to flow by the HS driver HSDB is denoted as IHS and is set to 17.78 mA, and the minimum value of the on-resistance of the switch element BSW2 in which process change and temperature change are taken into consideration is denoted by RONmin, Vth can be expressed as IHA×RONmin as an example. Note that, in order to secure a margin, Vth may be larger than 0 and smaller than IHA×RONmin.

In FIG. 15, the polarity determination circuit 72 of the detection circuit 70 determines that the polarity of the voltage difference VDF is negative. Accordingly, it is possible to detect that the port PT1 is an upstream port, and the port PT2 is a downstream port. In other words, it is possible to detect that the first bus BS1 is a bus on the upstream side, and the second bus BS2 is a bus on the downstream side. Note that in the case where the polarity determination circuit 72 determines that the polarity of the voltage difference VDF is positive, it is detected that the first bus BS1 is a bus on the downstream side, and the second bus BS2 is a bus on the upstream side. In addition, in FIG. 15, the voltage difference determination circuit 71 of the detection circuit 70 determines that the absolute value |VDF| of the voltage difference VDF has exceeded the threshold voltage value Vth. Accordingly, it is possible to detect that a device chirp K has been output to the second bus BS2 by the device 4.

In this embodiment, if such a device chirp K is detected after USB bus reset, the connection of the bus switch circuit 40 is switched from on to off. In other words, as shown in FIG. 16, the switch elements BSW1 and BSW2 of the bus switch circuit 40 are switched off. For example, in FIG. 14, after the timing t4, the connection of the bus switch circuit 40 is switched from on to off. The HS driver HSD1 of the first physical layer circuit 11 is then switched on. In other words, after the timing t4 in FIG. 14, the HS driver HSD1 of the first physical layer circuit 11 (PHY1) is switched on. At this time, the FS driver FSDA of the host 2 is on, and HS termination is on. Accordingly, a current from the HS driver HSD1 of the first physical layer circuit 11 flows into the resistor RSA2 of the host 2, and a device chirp K is output by the first physical layer circuit 11 to the first bus BS1. In other words, a repeat operation in which the first physical layer circuit 11 outputs a device chirp K to the first bus BS1 to repeat a device chirp K that has been output by the device 4 is realized. Accordingly, the host 2 recognizes this as if the device 4 output the device chirp K.

Since the bus switch circuit 40 is off at this time, the device chirp K that has been output to the second bus BS2 by the device 4 is not transmitted to the first bus BS1. The second physical layer circuit 12 then switches on the FS driver FSD2, and performs HS termination in place of the host 2. In other words, after the timing t4 in FIG. 14, the second physical layer circuit 12 (PHY2) switches on HS termination. Accordingly, it appears to the device 4 as if the host 2 performed the HS termination.

As described above, in FIGS. 15 and 16, when the device 4 outputs a device chirp K to the second bus BS2, this device chirp K is detected by the detection circuit 70. The connection between the first bus BS1 and the second bus BS2 is then switched off by the bus switch circuit 40, and the first physical layer circuit 11 outputs a device chirp K to the first bus BS1. Accordingly, the host 2 recognizes this as if the device 4 output the device chirp K, and it is possible to realize an operation that is the same as an operation of the device 4 outputting the host chirp K to the host 2 as shown in FIG. 11.

In addition, in FIG. 11, as a result of a current from the HS driver HSDB of the device 4 passing through the switch element BSW2, the problem of a decrease in the margin of the operation range of the constant current circuit of the HS driver HSDB due to the on-resistance RON of the switch element BSW2 occurs. On the other hand, in FIG. 16, the switch element BSW2 of the bus switch circuit 40 is off, and a current from the HS driver HSDB of the device 4 flows to the resistor RS22 of the second physical layer circuit 12 without passing through the switch element BSW2. Therefore, it is possible to solve the problem of a decrease in the margin of the operation range of the constant current circuit due to the on-resistance RON of the switch element BSW2.

Note that, when the device 4 stops outputting the device chirp K to the second bus BS2, the second physical layer circuit 12 detects this stop of output of the device chirp K. When stop of output of the device chirp K is detected on the second bus BS2, the first physical layer circuit 11 stops outputting the device chirp K to the first bus BS1. Specifically, as a result of the first physical layer circuit 11 (PHY1) switching off the HS driver HSD1 after a timing t5 in FIG. 14, output of the device chirp K to the first bus BS1 stops. According to this configuration, in conjunction with the device 4 stopping outputting of the device chirp K on the second bus BS2, the first physical layer circuit 11 also stops outputting the device chirp K on the first bus BS1 side.

Figure 17:
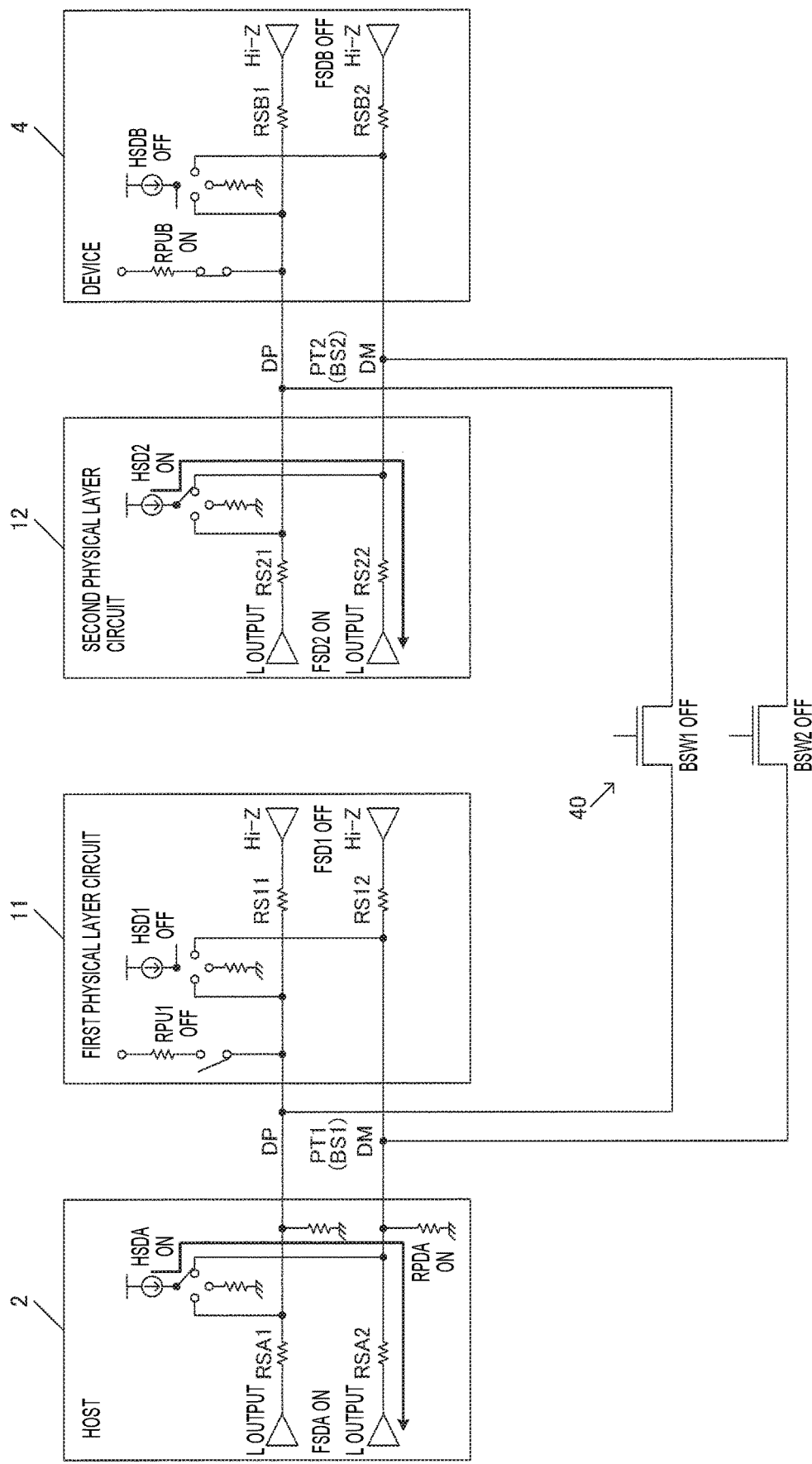
FIG. 17 is an illustrative diagram of detailed operations of this embodiment in a shift sequence from FS to HS.
Figure 18:
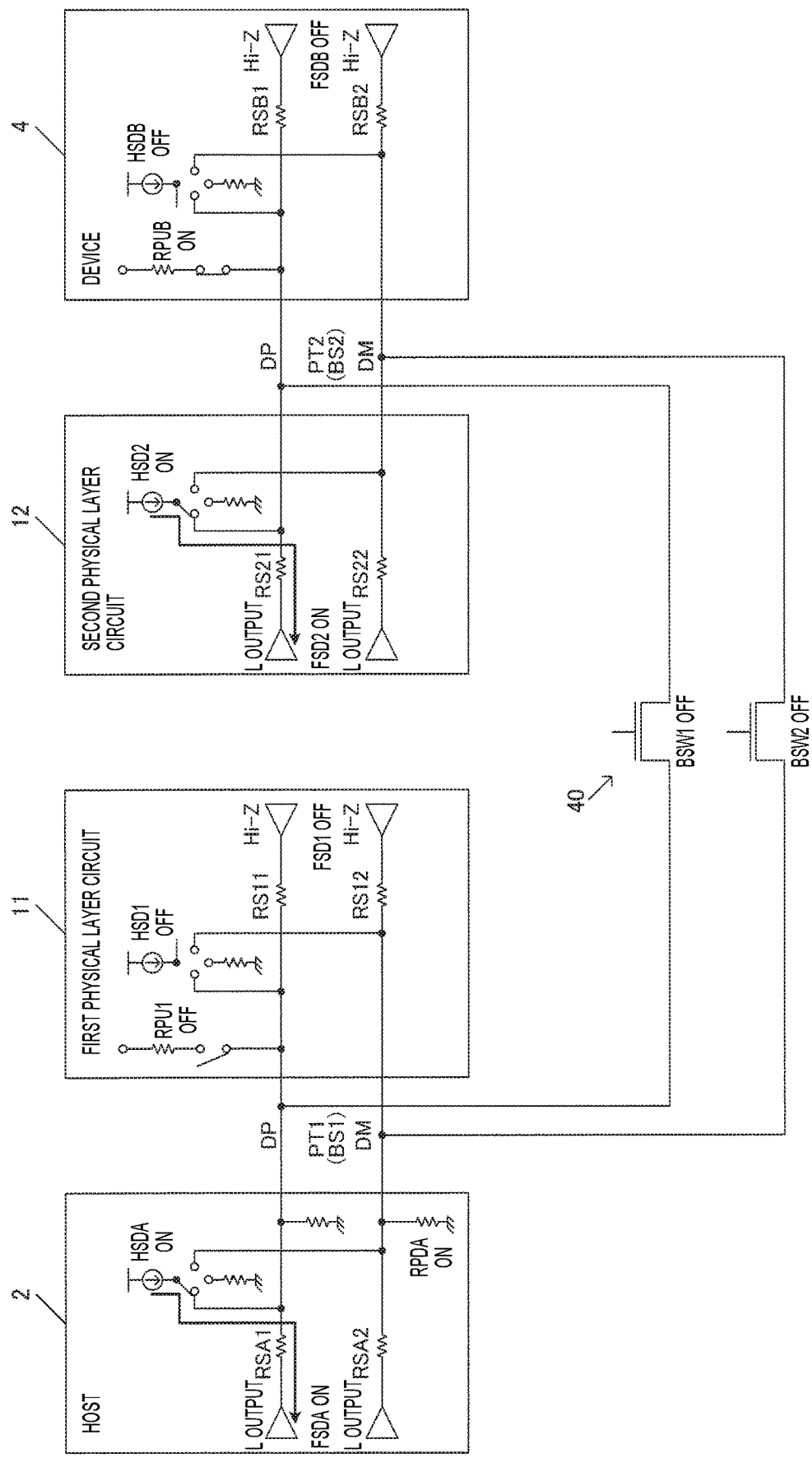
FIG. 18 is an illustrative diagram of detailed operations of this embodiment in a shift sequence from FS to HS.

FIGS. 17 and 18 are illustrative diagrams of operations of the circuit device 10 of this embodiment during a host chirp K/J(1). The host chirp K/J(1) is a host chirp K/J before the timing t7, before a shift to the HS mode is performed, as shown in FIG. 14. In the host chirp K in FIG. 17, the host 2 switches on the HS driver HSDA to allow a current to flow to the DM signal line side, and switches on the FS driver FSDA to switch on HS termination. Accordingly, a current from the HS driver HSDA flows to the resistor RSA2 on the DM signal line side, and a host chirp K is output to the first bus BS1. The first physical layer circuit 11 then detects this output of the host chirp K to the first bus BS1 by the host 2. For example, as a result of the first physical layer circuit 11 detecting a change in the voltage level on the DM signal line, it is possible to detect the host chirp K on the first bus BS1. When the host chirp K is detected on the first bus BS1 by the first physical layer circuit 11, the second physical layer circuit 12 switches on the HS driver HSD2 to allow a current to flow to the DM signal line side. The FS driver FSD2 of the second physical layer circuit 12 is switched on during the device chirp K in FIG. 16, and HS termination is in an on state. Accordingly, a current from the HS driver HSD2 flows into the resistor RS22 on the DM signal line side, and a host chirp K is output to the second bus BS2 by the second physical layer circuit 12. In other words, a repeat operation in which the second physical layer circuit 12 outputs a host chirp K to the second bus BS2 to repeat a host chirp K that has been output by the host 2 is realized. Accordingly, the device 4 recognizes this as if the host 2 output the host chirp K. Note that connection of the bus switch circuit 40 is off during this repeat output of the host chirp K.

In the host chirp J in FIG. 18, the host 2 switches on the HS driver HSDA to allow a current to flow to the DP signal line side. Accordingly, the current from the HS driver HSDA flows into the resistor RSA1 on the DP signal line, and a host chirp J is output to the first bus BS1. This output of the host chirp J to the first bus BS1 by the host 2 is then detected by the first physical layer circuit 11. For example, the first physical layer circuit 11 can detect the host chirp J on the first bus BS1 by detecting a change in the voltage level on the DP signal line. When the host chirp J on the first bus BS1 is detected by the first physical layer circuit 11, the second physical layer circuit 12 causes a current from the HS driver HSD2 to flow to the DP signal line side. Accordingly, the current from the HS driver HSD2 flows to the resistor RS21 on the DP signal line, and a host chirp J is output to the second bus BS2 by the second physical layer circuit 12. In other words, a repeat operation in which the second physical layer circuit 12 outputs a host chirp J to the second bus BS2 to repeat a host chirp J that has been output to the host 2 is realized. Accordingly, the device 4 recognizes this as if the host 2 output the host chirp J. Note that at the time of repeat output of the host chirp J, connection of the bus switch circuit 40 is off.

As described above, in FIGS. 17 and 18, when the host 2 outputs a host chirp K/J to the first bus BS1, this host chirp K/J is detected by the first physical layer circuit 11. The second physical layer circuit 12 then outputs a host chirp K/J to the second bus BS2. Accordingly, the device 4 recognizes this as if the host 2 output the host chirp K/J.

Figure 19:
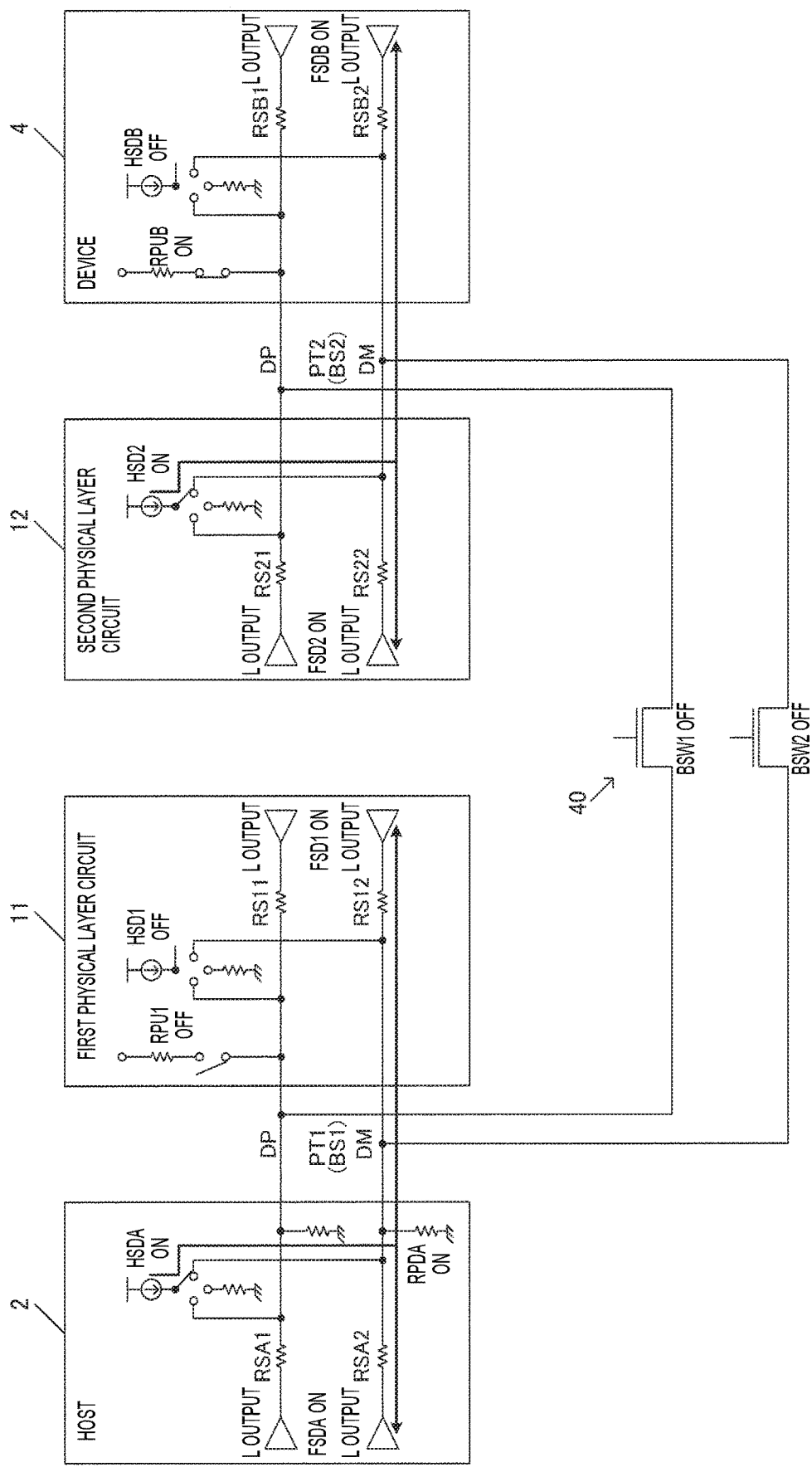
FIG. 19 is an illustrative diagram of detailed operations of this embodiment in a shift sequence from FS to HS.
Figure 20:
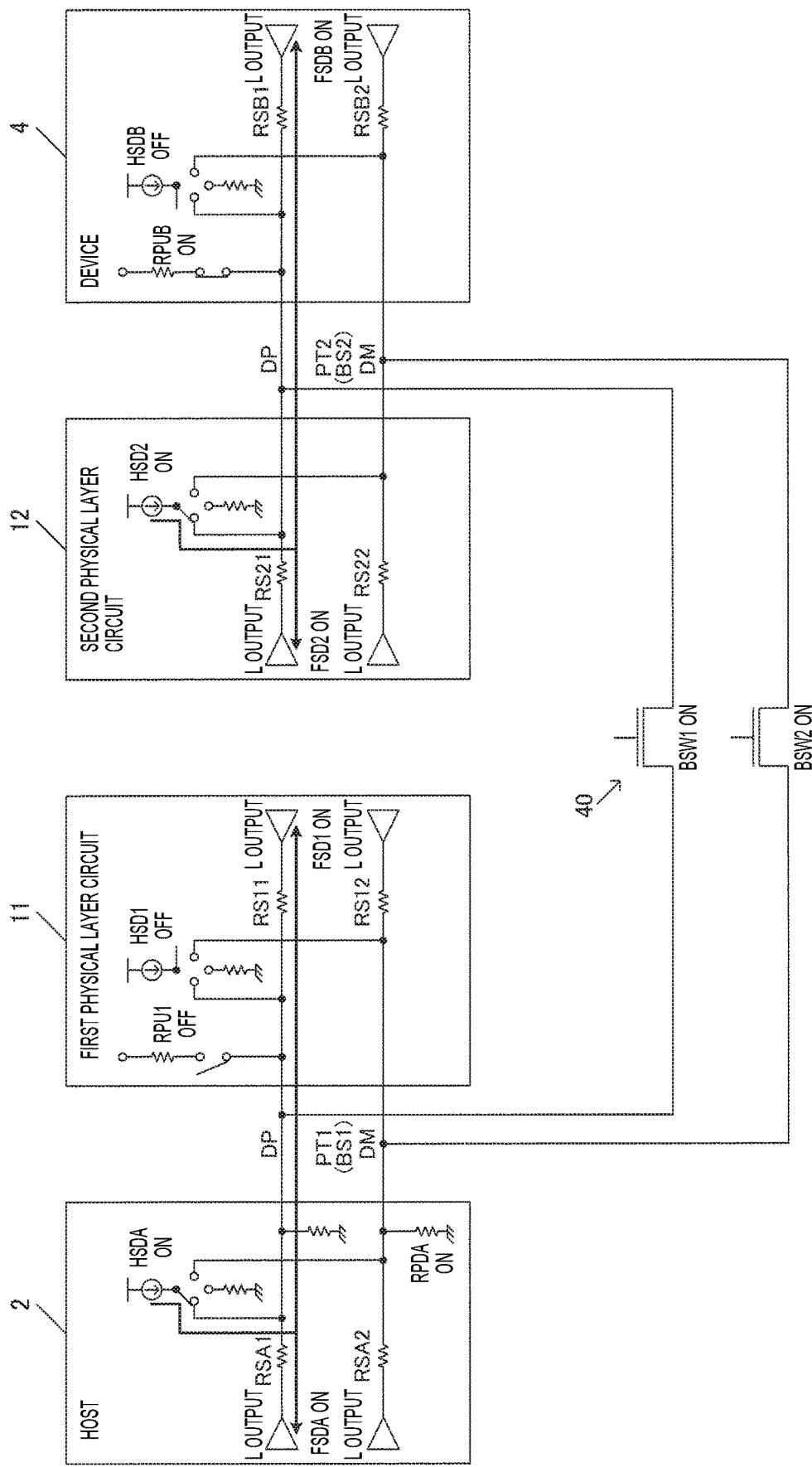
FIG. 20 is an illustrative diagram of detailed operations of this embodiment in a shift sequence from FS to HS.

FIGS. 19 and 20 are illustrative diagrams of operations of the circuit device 10 of this embodiment during a host chirp K/J(2). The host chirp K/J(2) is a host chirp K/J after the timing t7, after a shift to the HS mode is performed, as shown in FIG. 14.

As shown in FIGS. 17 and 18 above, when the host 2 outputs a host chirp K/J to the first bus BS1, this host chirp K/J is detected by the first physical layer circuit 11, and the second physical layer circuit 12 outputs a host chirp K/J to the second bus BS2. This host chirp K/J is a host chirp K/J(1) before a shift to the HS mode is performed in FIG. 14. The device 4 then detects the host chirp K/J that has been output to the second bus BS2 by the second physical layer circuit 12, and as indicated as the timing t7 in FIG. 14, switches on HS termination by switching on the FS driver FSDB, and performs a shift to the HS mode. Accordingly, the signal amplitude of a chirp signal falls from 800 mV to 400 mV, for example. The second physical layer circuit 12 then detects this fall in the signal amplitude of the chirp signal. When the fall in the signal amplitude is detected in this manner, the first physical layer circuit 11 switches on, in FIGS. 19 and 20, the FS driver FSD1 that is off in FIGS. 17 and 18, and switches on HS termination. In other words, after the timing t7 in FIG. 14, HS termination of the first physical layer circuit 11 (PHY1) is switched on. When the first physical layer circuit 11 switches on HS termination in this manner, the signal amplitude of a chirp signal on the first bus BS1 also falls from 800 mV to 400 mV, for example. Accordingly, the host 2 recognizes this as if the device 4 detected a host chirp K/J, and switches on HS termination. In addition, as a result of the signal amplitude on the first bus BS1 falling in this manner, the host 2 also shifts to the HS mode.

Specifically, during the host chirp K in FIG. 19, a current from the HS driver HSDA of the host 2 flows to the resistor RSA2 of the host 2, and also flows to the resistor RS12 of the first physical layer circuit 11 that has switched on HS termination as described above. As a result of a current flowing to both the resistor RSA2 and the resistor RS12 in this manner, the signal amplitude of a DM signal on the first bus BS1 decreases. In addition, during the host chirp K, a current from the HS driver HSD2 of the second physical layer circuit 12 flows to the resistor RS22 of the second physical layer circuit 12, and also flows to the resistor RSB2 of the device 4. In other words, the second physical layer circuit 12 performs an operation of repeating the host chirp K.

In addition, during the host chirp J in FIG. 20, a current from the HS driver HSDA of the host 2 flows to the resistor RSA1 of the host 2, and also flows to the resistor RS11 of the first physical layer circuit 11 that has switched on HS termination. As a result of a current flowing to both the resistor RSA1 and the resistor RS11 in this manner, the signal amplitude of a DP signal on the first bus BS1 decreases. In addition, during the host chirp J, a current from the HS driver HSD2 of the second physical layer circuit 12 flows to the resistor RS21 of the second physical layer circuit 12, and also flows to the resistor RSB1 of the device 4. In other words, the second physical layer circuit 12 performs an operation of repeating the host chirp J.

As described above, in FIGS. 19 and 20, the circuit device 10 also performs an operation of repeating the host chirp K/J(2). In addition, when the device 4 switches on the FS driver FSDB, and performs HS termination on the second bus BS2, the first physical layer circuit 11 also switches on the FS driver FSD1, and performs HS termination on the first bus BS1 side as well. Accordingly, it is possible to shift both the host 2 and the device 4 to the HS mode.

For example, in FIGS. 12 and 13 above, a current from the HS driver HSDA of the host 2 passes through the switch elements BSW1 and BSW2. Therefore, due to the on-resistance RON of the switch elements BSW1 and BSW2, a chirp signal deviates from the voltage range of the authentication standard, and the signal voltage of a host chirp K/J becomes largely unbalanced, and thus there is a risk that problems such as a reception error will occur. In this regard, in FIGS. 19 and 20, the switch elements BSW1 and BSW2 of the bus switch circuit 40 are off, and a current from the HS driver HSDA of the host 2 flows to the resistors RS11 and RS12 of the first physical layer circuit 11 without passing through the switch elements BSW1 and BSW2. Therefore, it is possible to solve the problems that a chirp signal deviates from the voltage range of the authentication standard due to the on-resistance RON of the switch elements BSW1 and BSW2, the signal voltage of a host chirp K/J becomes largely unbalanced, and the like.

Next, detailed operation sequences at the time of resetting and suspending the HS mode of this embodiment will be described.

Figure 21:
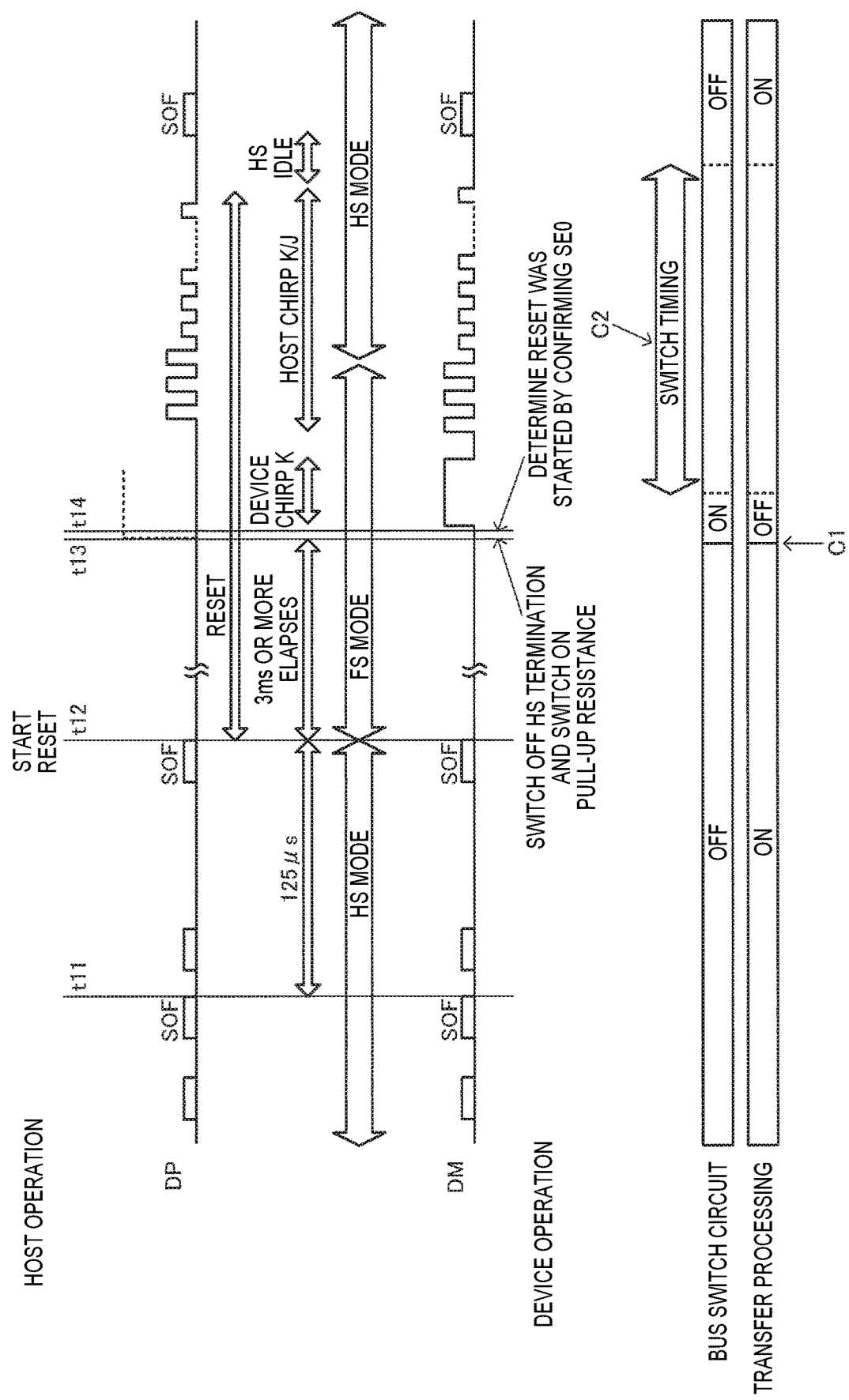
FIG. 21 is a signal waveform diagram illustrating an operation sequence of this embodiment at the time of HS reset.

FIG. 21 is a signal waveform diagram showing an operation sequence when a reset is performed in HS mode transfer. In the HS mode, the host transmits an SOF packet every 125 μs (t11, t12). If the host starts a reset (t12), a shift to the FS mode is performed, and if a state where no packet is on the bus has continued for 3 ms or more, the device switches off HS termination, and switches on the pull-up resistance (t13). On the device, it is confirmed that the bus state is SE0 (t14), and therefore it is determined that a reset was started, and a device chirp K is transmitted. In response to this, the host transmits a host chirp K/J, and a shift from the FS mode to the HS mode is performed.

As indicated by C1 in FIG. 21, in this embodiment, if the host starts a reset, the bus switch circuit 40 is switched from off to on, and transfer processing performed by the processing circuit 20 is switched from on to off. In other words, if a reset is performed by the host, the bus switch circuit 40 switches the connection between the first bus BS1 and the second bus BS2 from off to on, and the processing circuit 20 stops performing transfer processing. According to this configuration, if a reset is performed during HS mode transfer for example, the first bus BS1 and the second bus BS2 become electrically connected, and signal transfer can be performed using the signals DP and DM between the host and the device. Thereafter, at a switch timing in the range indicated by C2 in FIG. 21 for example, the bus switch circuit 40 is switched from on to off, and transfer processing performed by the processing circuit 20 is switched from off to on. Accordingly, it is possible to appropriately shift to HS mode transfer processing after the exchange of signals between the host and the device.

Figure 22:
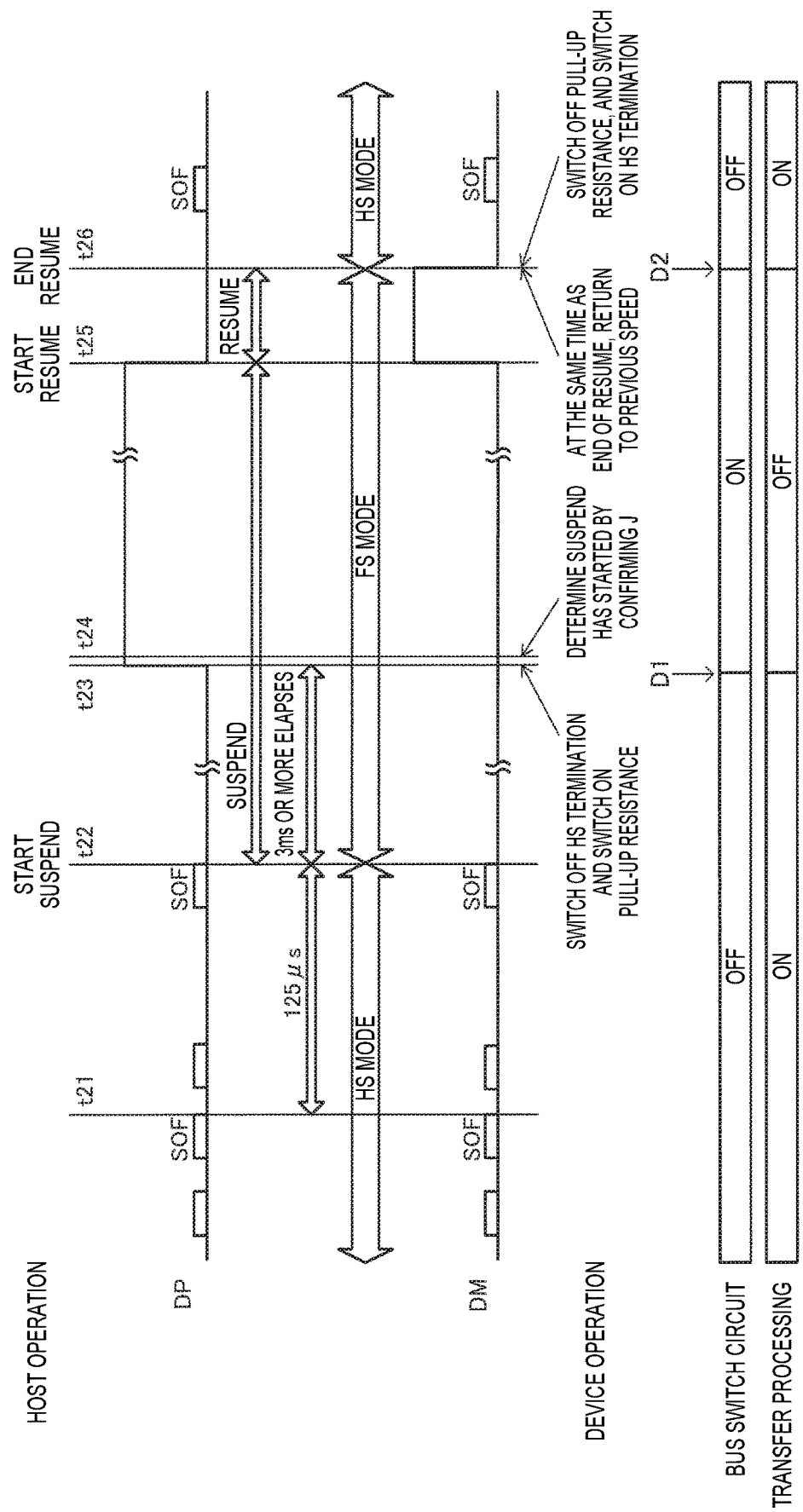
FIG. 22 is a signal waveform diagram illustrating an operation sequence of this embodiment at the time of HS suspend.

FIG. 22 is a signal waveform diagram showing an operation sequence in the case of a shift from HS mode transfer to suspend and a shift to resume. If the host starts a suspend (t22), a shift to the FS mode is performed, and if a state where no packet is on the bus has continued for 3 ms or more, the device switches off HS termination, and switches on the pull-up resistance (t23). Then, on the device, it is confirmed that the state of the bus is J (t24), and therefore it is determined that a suspend has started. Then the host starts a resume (t25), and when the resume ends (t26), at the same time as the end of the resume, the device returns to the mode that was realized prior to the suspend. Then the pull-up resistance is switched off, the HS termination is switched on, and the mode returns to the HS mode. As indicated by D1 in FIG. 22, in this embodiment, even if the host starts a suspend, the bus switch circuit 40 is switched from off to on, and transfer processing performed by the processing circuit 20 is switched from on to off. In other words, if a suspend is performed by the host, the bus switch circuit 40 switches the connection between the first bus BS1 and the second bus BS2 from off to on, and the processing circuit 20 stops performing transfer processing. According to this configuration, if a suspend is performed during HS mode transfer for example, the first bus BS1 and the second bus BS2 become electrically connected, and signal transfer can be performed using the signals DP and DM between the host and the device for example. Then, after the suspend, the host performs a resume, and therefore, as indicated by D2 in FIG. 22, the bus switch circuit 40 is switched from on to off, and the transfer processing performed by the processing circuit 20 is switched from off to on. Accordingly, by performing a resume after a suspend, HS mode data transfer can be appropriately resumed. Note that the operation sequence of a shift from suspend to reset is similar to the operation sequence of a shift from suspend to reset after a shift from cable attachment to FS idle.

4. Electronic Device and Cable Harness

Figure 23:
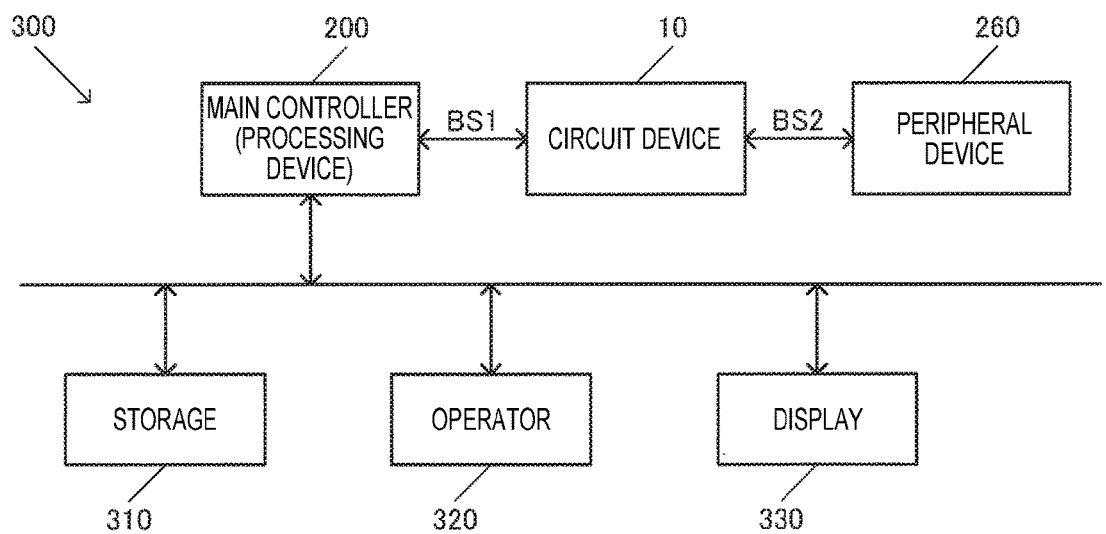
FIG. 23 shows a configuration example of an electronic device.

FIG. 23 shows a configuration example of an electronic device 300 that includes the circuit device 10 of this embodiment. This electronic device 300 includes the circuit device 10 of this embodiment and the main controller 200 that is a processing device. The main controller 200 is connected to the first bus BS1. For example, the main controller 200 and the circuit device 10 are connected via the first bus BS1. Also, the peripheral device 260, for example, is connected to the second bus BS2 of the circuit device 10.

The main controller 200 is realized by a processor such as a CPU or an MPU. Alternatively, the main controller 200 may be realized by any of various ASIC circuit devices. Moreover, the main controller 200 may be realized by a circuit board on which multiple circuit devices (ICs) and circuit components are mounted. The portable terminal device 250 shown in FIG. 1 or the like can be envisioned as the peripheral device 260, but there is no limitation to this. The peripheral device 260 may be a wearable device or the like.

The electronic device 300 can further include a storage 310, an operator 320, and a display 330. The storage 310 is for storing data, and the functionality thereof can be realized by an HDD (hard disk drive), a semiconductor memory such as a RAM or a ROM, or the like. The operator 320 enables a user to perform input operations, and can be realized by operation devices such as operation buttons or a touch panel display. The displayer 330 is for displaying various types of information, and can be realized by a display such as a liquid crystal display or an organic EL display. Note that in the case of using a touch panel display as the operator 320, this touch panel display can realize the functionality of both the operator 320 and the display 330.

Various types of devices can be envisioned as the electronic device 300 realized by this embodiment, examples of which include a vehicle-mounted device, a printing device, a projecting device, a robot, a head-mounted display device, a biological information measurement device, a measurement device for measuring a physical quantity such as distance, time, flow speed, or flow rate, a network-related device such as a base station or a router, a content provision device that distributes content, and a video device such as a digital camera or a video camera.

Figure 24:
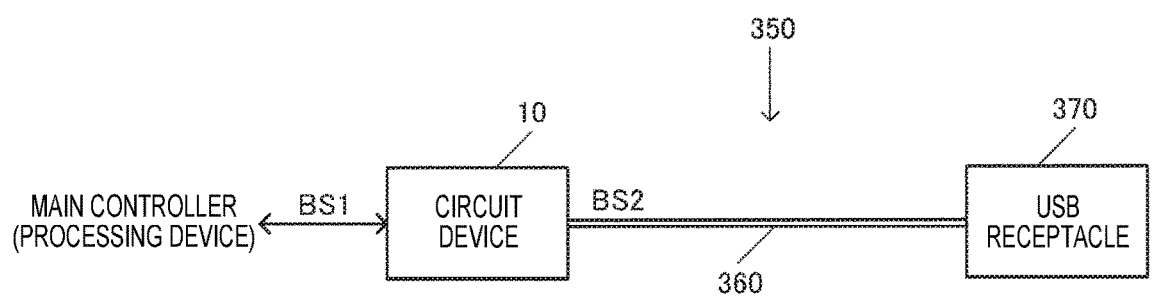
FIG. 24 shows a configuration example of a cable harness.

FIG. 24 shows a configuration example of a cable harness 350 that includes the circuit device 10 of this embodiment. The cable harness 350 includes the circuit device 10 of this embodiment and a cable 360. The cable 360 is a USB cable. The cable harness 350 may include a USB receptacle 370. Alternatively, the cable harness 350 may include the electrostatic protection circuit 222 and the short-circuit protection circuit 223 in FIG. 1, for example. The cable 360 is connected to the second bus BS2 of the circuit device 10, for example. The main controller 200 that is a processing device or the like is connected to the first bus BS1 side of the circuit device 10. This cable harness 350 is used in an application such as the routing of a wire in a vehicle, for example. Note that the cable harness 350 may be a harness for an application other than a vehicle.

Note that although an embodiment has been explained in detail above, a person skilled in the art will readily appreciate that it is possible to implement numerous variations and modifications that do not depart substantially from the novel aspects and effect of the invention. Accordingly, all such variations and modifications are also to be included within the scope of the invention. For example, terms that are used within the description or drawings at least once together with broader terms or alternative synonymous terms can be replaced by those other terms at other locations as well within the description or drawings. Also, all combinations of the embodiment and variations are also encompassed in the range of the invention. Moreover, the configuration and operation of the circuit device, the electronic device, and the cable harness, as well as the bus monitor processing, the bus switch processing, the transfer processing, the disconnection detection processing, the upstream port detection processing, and the like are not limited to those described in the embodiment, and various modifications are possible.

What is claimed is:

1. A circuit device comprising:
   a first physical layer circuit to which a first bus that complies with a USB standard is connected;
   a second physical layer circuit to which a second bus that complies with the USB standard is connected;
   a bus switch circuit, one end of which is connected to the first bus, another end of which is connected to the second bus, and that switches connection between the first bus and the second bus on in a first period and off in a second period; and
   a processing circuit that performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit,
   wherein, when a host chirp K/J is detected on the first bus by the first physical layer circuit, the second physical layer circuit outputs a host chirp K/J to the second bus in a state where connection between the first bus and the second bus is switched off by the bus switch circuit.

2. The circuit device according to claim 1,
   wherein, in a case where HS termination is detected on the second bus by the second physical layer circuit, the first physical layer circuit switches on HS termination of the first physical layer circuit.

3. The circuit device according to claim 2,
   wherein the first physical layer circuit detects the host chirp K/J on the first bus in a state where the HS termination of the first physical layer circuit is off, and in a case where the HS termination is detected on the second bus by the second physical layer circuit, switches on the HS termination of the first physical layer circuit.

4. The circuit device according to claim 1,
   wherein, when a device chirp K is detected on the second bus, the first physical layer circuit outputs a device chirp K to the first bus in a state where connection between the first bus and the second bus is switched off by the bus switch circuit.

5. The circuit device according to claim 4, further comprising:
a detection circuit that performs current detection in the bus switch circuit,
wherein, when the detection circuit detects flow of a current from the second bus to the first bus via the bus switch circuit after USB bus reset, the first physical layer circuit outputs the device chirp K to the first bus.

6. The circuit device according to claim 5,
wherein, when the detection circuit detects flow of a current from the second bus to the first bus via the bus switch circuit, the bus switch circuit switches connection between the first bus and the second bus from on to off, and the second physical layer circuit switches on HS termination of the second physical layer circuit.

7. The circuit device according to claim 5,
wherein, when a current flows from the second bus to the first bus via the bus switch circuit after the bus reset, the detection circuit detects that the first bus is a bus on an upstream side and the second bus is a bus on a downstream side, and when a current flows from the first bus to the second bus via the bus switch circuit after the bus reset, detects that the first bus is a bus on a downstream side and the second bus is a bus on an upstream side.

8. The circuit device according to claim 4,
wherein, when stop of output of the device chirp K is detected on the second bus, the first physical layer circuit stops outputting the device chirp K to the first bus.

9. The circuit device according to claim 8,
wherein, when the host chirp K/J is detected on the first bus by the first physical layer circuit after stop of the device chirp K on the second bus, the second physical layer circuit outputs the host chirp K/J to the second bus.

10. A circuit device comprising:
a first physical layer circuit to which a first bus that complies with a USB standard is connected;
a second physical layer circuit to which a second bus that complies with the USB standard is connected;
a bus switch circuit, one end of which is connected to the first bus, another end of which is connected to the second bus, and that switches connection between the first bus and the second bus on in a first period and off in a second period;
a processing circuit that performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit; and
a detection circuit that detects that the first bus is a bus on an upstream side and the second bus is a bus on a downstream side, when a current flows from the second bus to the first bus via the bus switch circuit after USB bus reset, and detects that the first bus is a bus on a downstream side and the second bus is a bus on an upstream side, when a current flows from the first bus to the second bus via the bus switch circuit after the bus reset.

11. The circuit device according to claim 10,
wherein, when the detection circuit detects flow of a current from the second bus to the first bus via the bus switch circuit after the bus reset, the first physical layer circuit outputs a device chirp K to the first bus.

12. The circuit device according to claim 11,
wherein, when a host chirp K/J is detected on the first bus by the first physical layer circuit, the second physical layer circuit outputs a host chirp K/J to the second bus.

13. An electronic device comprising:
the circuit device according to claim 1; and
a processing device that is connected to the first bus.

14. A cable harness comprising:
the circuit device according to claim 1; and
a cable.

* * * * *